United States Patent

Kosugi

[11] Patent Number: 6,005,633
[45] Date of Patent: Dec. 21, 1999

[54] SIGNAL TRANSMITTING-RECEIVING SYSTEM

[75] Inventor: Hiroshi Kosugi, Kanagawa, Japan

[73] Assignee: Sony Corporation, Tokyo, Japan

[21] Appl. No.: 08/820,672

[22] Filed: Mar. 18, 1997

[30]     Foreign Application Priority Data

Mar. 28, 1996 [JP] Japan .................................. 8-074593

[51] Int. Cl.⁶ .................................................. H04N 9/475
[52] U.S. Cl. .......................... 348/518; 348/516; 348/462; 348/15; 348/722; 370/263; 370/517
[58] Field of Search ................ 348/15, 563, 20, 348/565, 121.3, 723, 722, 584, 561, 518, 515, 432, 462; 370/260, 263, 517

[56]                  References Cited

U.S. PATENT DOCUMENTS

| | | | |
|---|---|---|---|
| 4,218,705 | 8/1980 | Inaba et al. ............................... | 348/512 |
| 4,282,606 | 8/1981 | Factor ...................................... | 455/260 |
| 4,289,932 | 9/1981 | Reed ........................................ | 370/268 |
| 4,313,135 | 1/1982 | Cooper ..................................... | 348/512 |
| 4,360,827 | 11/1982 | Braun ....................................... | 348/15 |
| 4,703,355 | 10/1987 | Cooper ..................................... | 348/518 |
| 4,849,811 | 7/1989 | Kleinerman ............................... | 348/423 |
| 5,202,761 | 4/1993 | Cooper ..................................... | 348/515 |
| 5,327,438 | 7/1994 | Okuyama ................................. | 371/37.11 |
| 5,430,485 | 7/1995 | Lankford et al. ........................ | 348/423 |
| 5,452,012 | 9/1995 | Saitoh ...................................... | 348/563 |
| 5,463,641 | 10/1995 | Dorward et al. ........................ | 371/37.11 |
| 5,465,267 | 11/1995 | Todoroki ................................. | 371/37.11 |
| 5,497,194 | 3/1996 | Sakagami et al. ....................... | 348/722 |
| 5,502,512 | 3/1996 | Toyoda et al. .......................... | 348/584 |
| 5,546,324 | 8/1996 | Palmer et al. ........................... | 348/15 |
| 5,555,443 | 9/1996 | Ikehama .................................. | 348/15 |
| 5,606,569 | 2/1997 | MacDonald et al. .................. | 371/37.11 |
| 5,619,183 | 4/1997 | Ziegra et al. ........................... | 340/505 |
| 5,781,248 | 7/1998 | Chida ...................................... | 348/584 |
| 5,821,984 | 10/1998 | Ito et al. ................................. | 348/15 |
| 5,914,940 | 6/1999 | Fukuoka et al. ........................ | 370/263 |

*Primary Examiner*—Andrew I. Faile
*Assistant Examiner*—Reuben M. Brown
*Attorney, Agent, or Firm*—Limbach & Limbach L.L.P.

[57]                    ABSTRACT

A signal transmitting-receiving system which has a signal transmitting side system constructed by signal transmitter T1, voice processor T2 and signal receiver T3 and also has a signal receiving side system constructed by signal receiver R1, synthesis circuit R4, signal transmitter R5 and delay circuit R3. The signal transmitting-receiving system is constructed such that no processing for making a video signal coincide with a voice used in communication using voices in position on a time axis is performed.

13 Claims, 11 Drawing Sheets

CONSTRUCTIONAL VIEW OF SIGNAL TRANSMITTING-RECEIVING SYSTEM SHOWING FIRST EMBODIMENT FORM

FIG. 1  EXPLANATORY VIEW FOR EXPLAINING CONCEPT OF THE PRESENT INVENTION

CONSTRUCTIONAL VIEW OF SIGNAL TRANSMITTING-RECEIVING SYSTEM SHOWING FIRST EMBODIMENT FORM

CONSTRUCTIONAL VIEW SHOWING EXAMPLE OF INTERNAL CONSTRUCTION OF DATA SEPARATING CIRCUIT SHOWN IN FIG. 3

EXPLANATORY VIEW SHOWING ONE EXAMPLE OF DATA FORMAT ON TRANSMITTING SIDE

CONSTRUCTIONAL VIEW OF SIGNAL TRANSMITTING-RECEIVING SYSTEM SHOWING SECOND EMBODIMENT FORM

VIEW OF INTERNAL CONSTRUCTIONS OF CODING CIRCUIT AND DECODING CIRCUIT SHOWN IN FIG. 8

EXPLANATORY VIEW SHOWING ONE EXAMPLE OF DATA FORMAT ON TRANSMITTING SIDE

EXPLANATORY VIEW FOR EXPLAINING TRANSMISSION DELAY IN CASE USING CONVENTIONAL SIGNAL TRANSMITTING-RECEIVING SYSTEM

SIGNAL TRANSMITTING-RECEIVING SYSTEM

TECHNICAL FIELD

The present invention relates to a signal transmitting-receiving system using an artificial satellite e.g., as a relay and a signal transmitting-receiving system for suitably communicating signals only on the ground.

BACKGROUND ART

It has been proposed to use remote news gathering television units which are linked to a studio by a communication system which uses one or more artificial satellites. Such a communication system could use digital video and audio signals. In particular, the video signals, in the course of being sent by means of the system, could advantageously undergo MPEG-2 compression and decompression which would introduce delay times vis-a-vis the corresponding audio signal, resulting in a possible verbal communication problems, particularly when combined with video and audio signals generated at a studio.

SUMMARY OF THE INVENTION

In consideration of such points, the present invention provides a signal transmitting-receiving system capable of smoothly enabling verbal communication between remote locations while, at the same time, transmitting and receiving compressed video signals.

In the present invention, a picture image in a first spot and a voice of a person located in this first spot are transmitted to a signal receiving side system having a signal transmitting-receiving function and located in a second spot by a signal transmitting side system having a signal transmitting-receiving function; the picture image and the voice in the first spot and a picture image in the second spot and a voice of a person located in this second spot are synthesized in the signal receiving side system and are transmitted from this signal receiving side system; the voice of the person located in the second spot is transmitted to the signal receiving side system to communicate the voices between the person located in the first spot and the person located in the second spot; and no delay processing for making positions of the voices coincide with positions of the picture images on a time axis is performed in the communication between the person located in the first spot and the person located in the second spot.

BRIEF DESCRIPTION OF DRAWINGS

FIGS. 3A and 3B are views showing each of the internal constructions of a coding circuit and a decoding circuit shown in FIG. 2, wherein FIG. 3A is a constructional view showing an example of the internal construction of the coding circuit 150 shown in FIG. 2 and FIG. 3B is a constructional view showing an example of the internal construction of the decoding circuit 200 shown in FIG. 2.

FIGS. 7A and 7B are views showing each of the internal constructions of a coding circuit and a decoding circuit shown in FIG. 6, wherein FIG. 7A is a constructional view showing an example of the internal construction of the coding circuit 250 shown in FIG. 6 and FIG. 7B is a constructional view showing an example of the internal construction of the decoding circuit 300 shown in FIG. 6.

FIGS. 9A and 9B are views showing each of the internal constructions of a coding circuit and a decoding circuit shown in FIG. 8, wherein FIG. 9A is a constructional view showing an example of the internal construction of the coding circuit 50 shown in FIG. 8 and FIG. 9B is a constructional view showing an example of the internal construction of the decoding circuit 100 shown in FIG. 8.

DETAILED DESCRIPTION OF THE PREFERRED EMBODIMENTS

The embodiment forms of the present invention will next be explained in detail with sequential reference to FIGS. 8 to 11 and 1 to 7.

Figure 1:
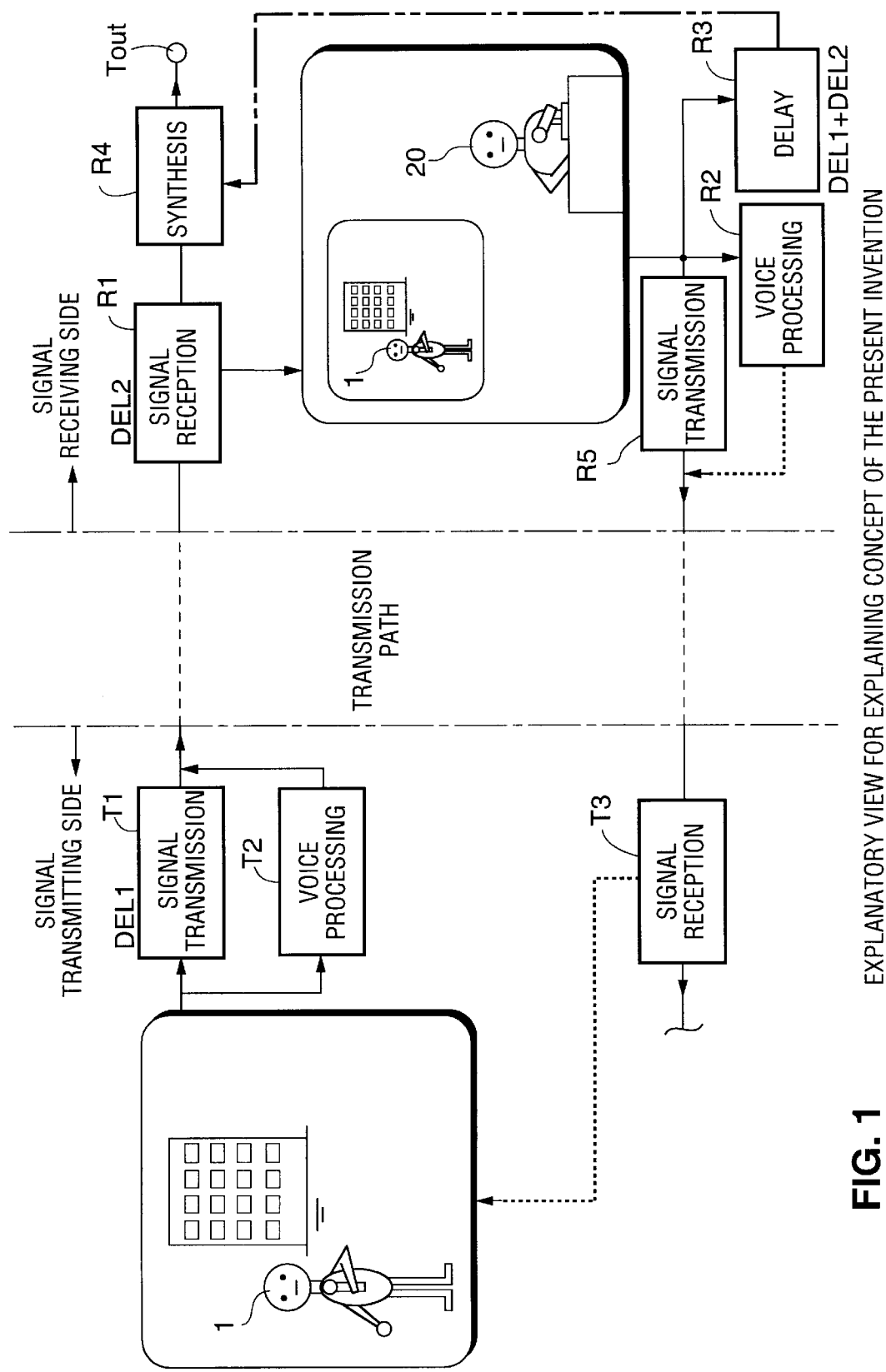
FIG. 1 is an explanatory view for explaining the concept of the present invention.
Figure 2:
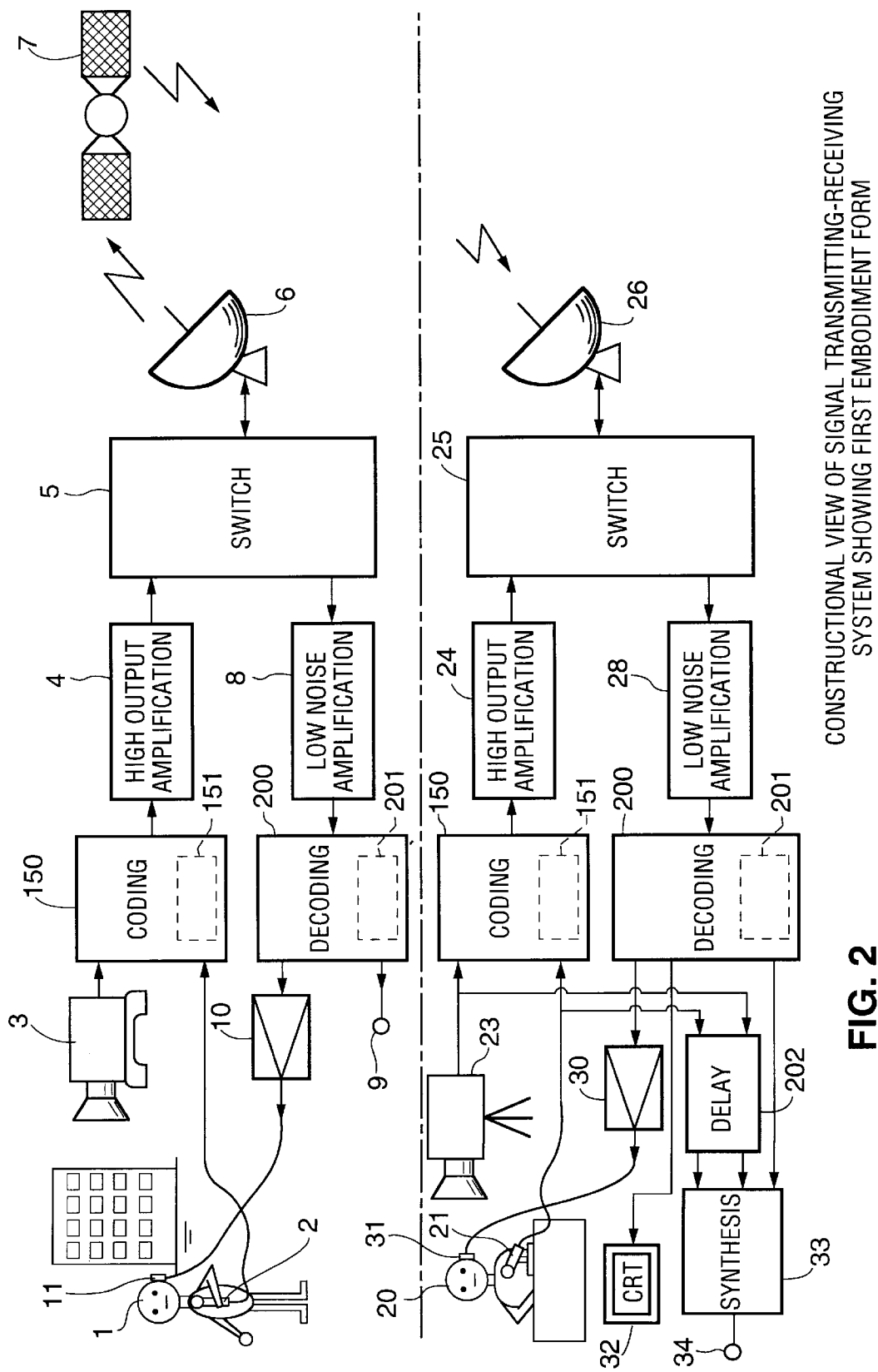
FIG. 2 is a constructional view of a signal transmitting-receiving system showing a first embodiment form of the present invention.
Figure 3:
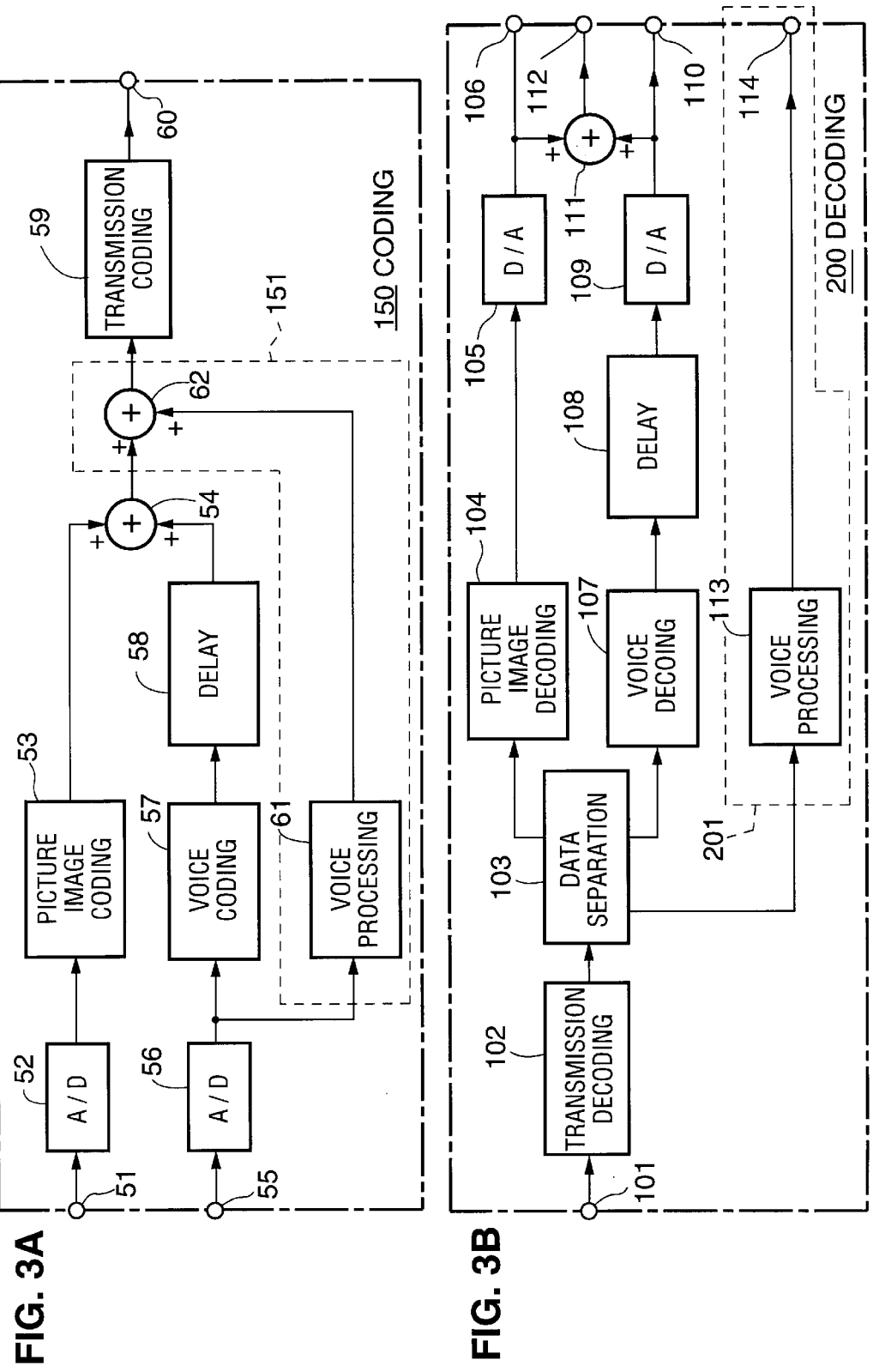
Figure 4:
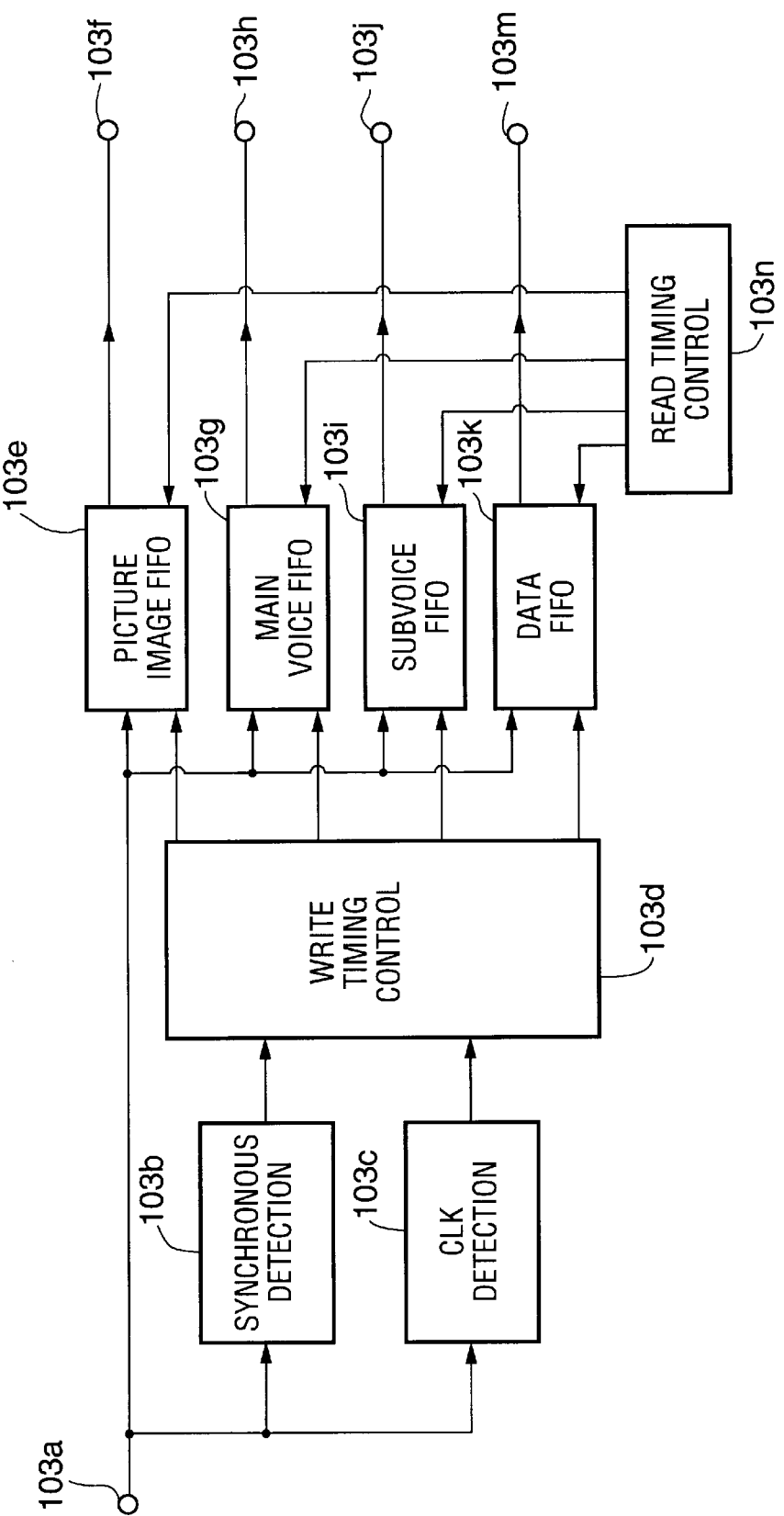
FIG. 4 is a constructional view showing an example of the internal construction of a data separating circuit 103 shown in FIG. 3B.
Figure 5:
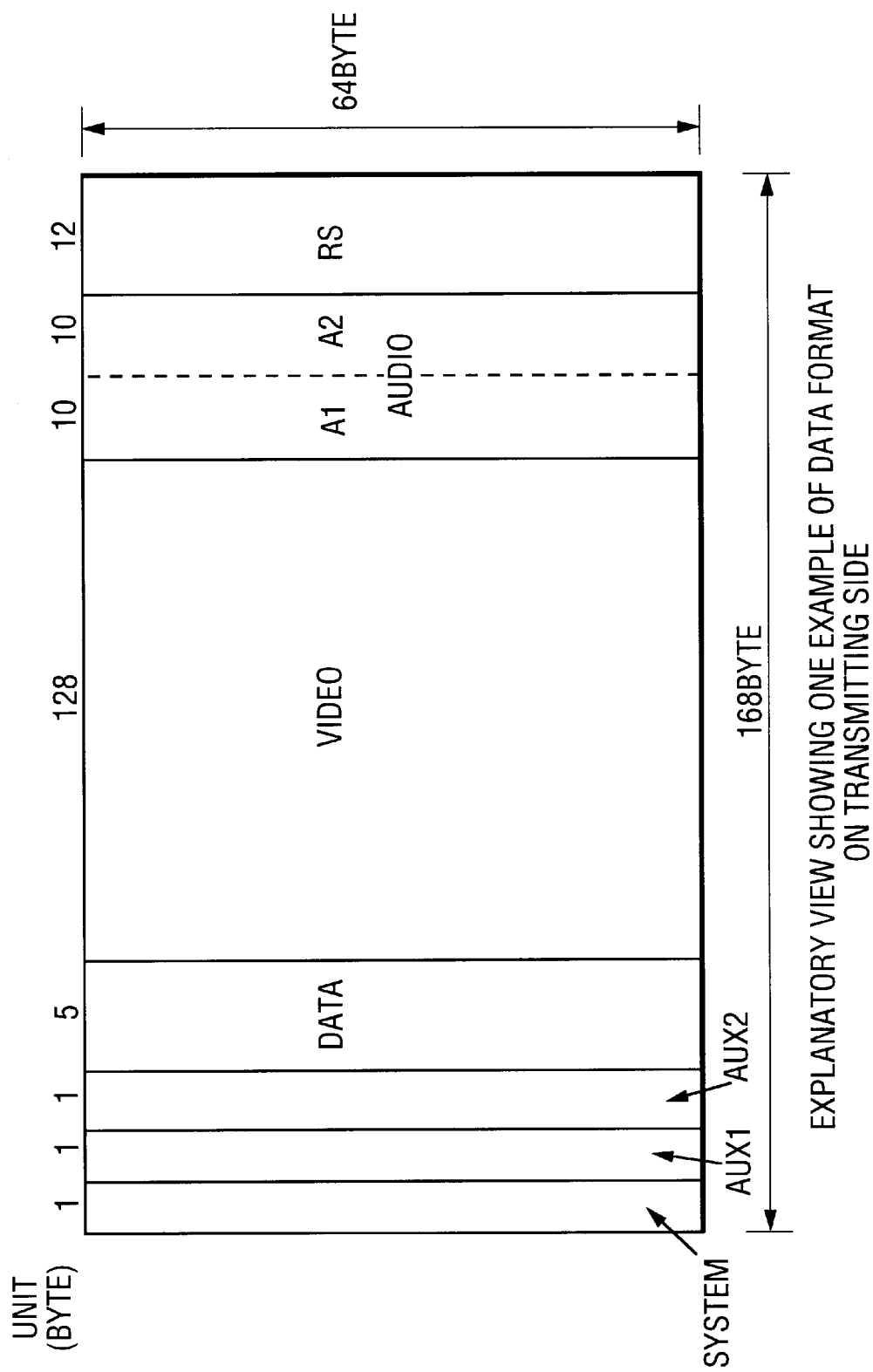
FIG. 5 is an explanatory view showing one example of a data format.
Figure 6:
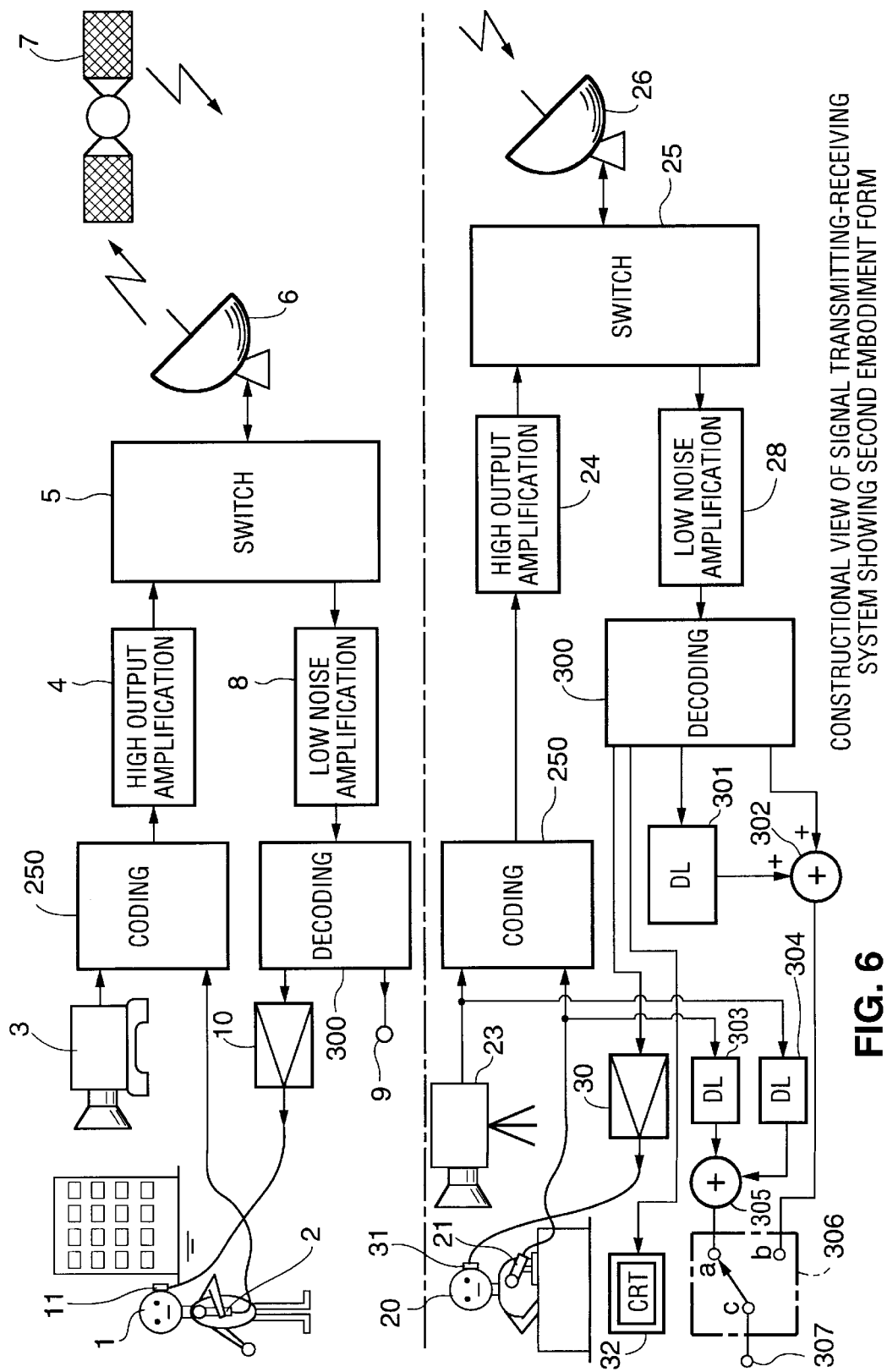
FIG. 6 is a constructional view of a signal transmitting-receiving system showing a second embodiment form of the present invention.
Figure 7:
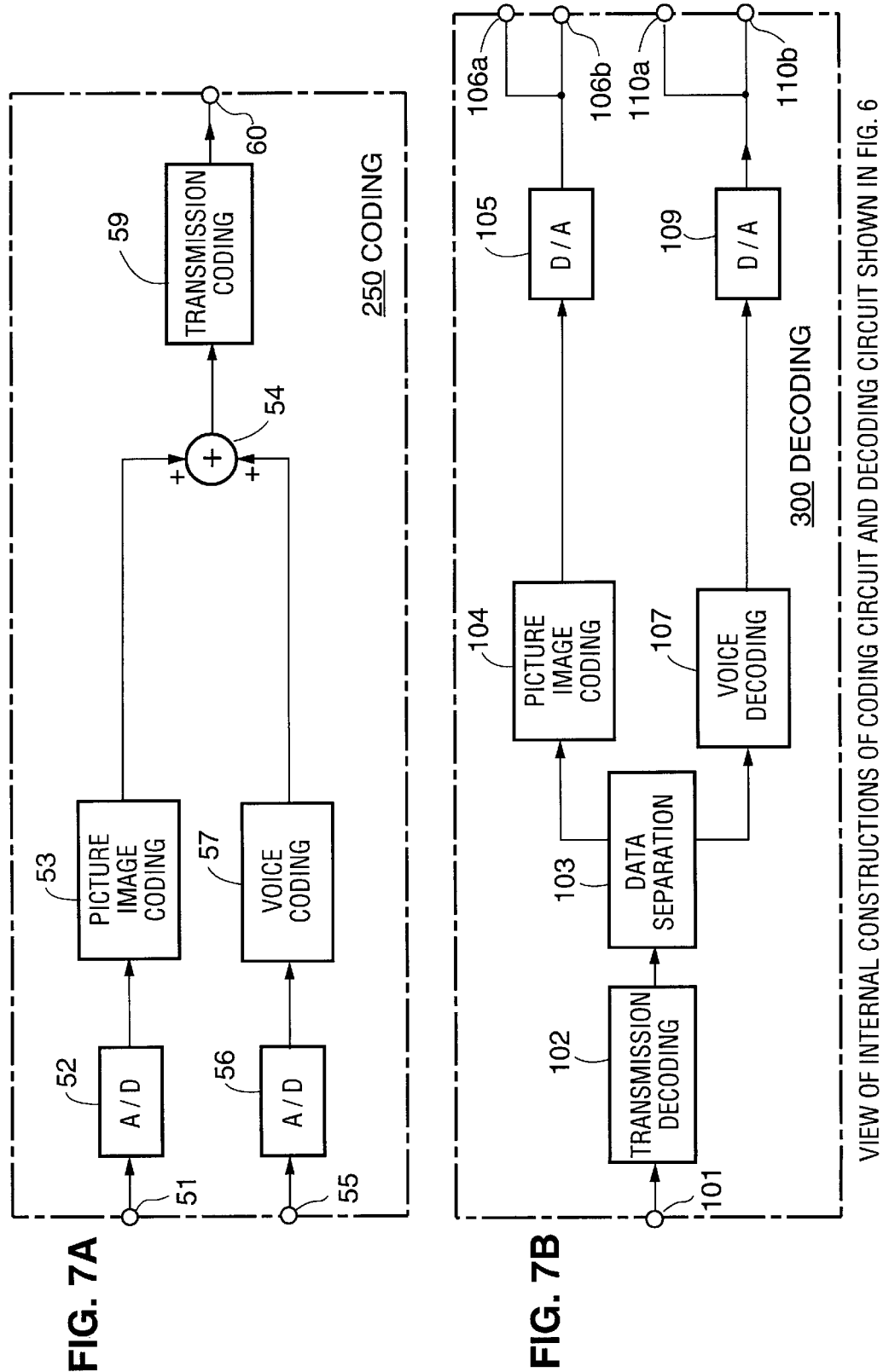

In an explanation of the embodiment forms of the present invention, the following item explanations will be described in heads of the respective items and these items will be explained in the following order:

A. Description of a proposed digital signal transmitting and receiving system using one or more artificial satellites (FIGS. 8–11).
B. Summary explanation of the present invention (FIG. 1).
First Embodiment
C. Explanation of signal transmitting-receiving system (FIG. 2).
D. Explanation of coding circuit and decoding circuit shown in (FIGS. 2, 3).
E. Explanation of data separating circuit shown in (FIGS. 3, 4).
F. Data format at transmitting time (FIG. 5).
Second Embodiment
G. Explanation of signal transmitting-receiving system (FIG. 6).
H. Explanation of coding circuit and decoding circuit shown in (FIGS. 6, 7).
A. Description of a proposed digital signal transmitting and receiving system using one or more artificial satellites.

Figure 8:
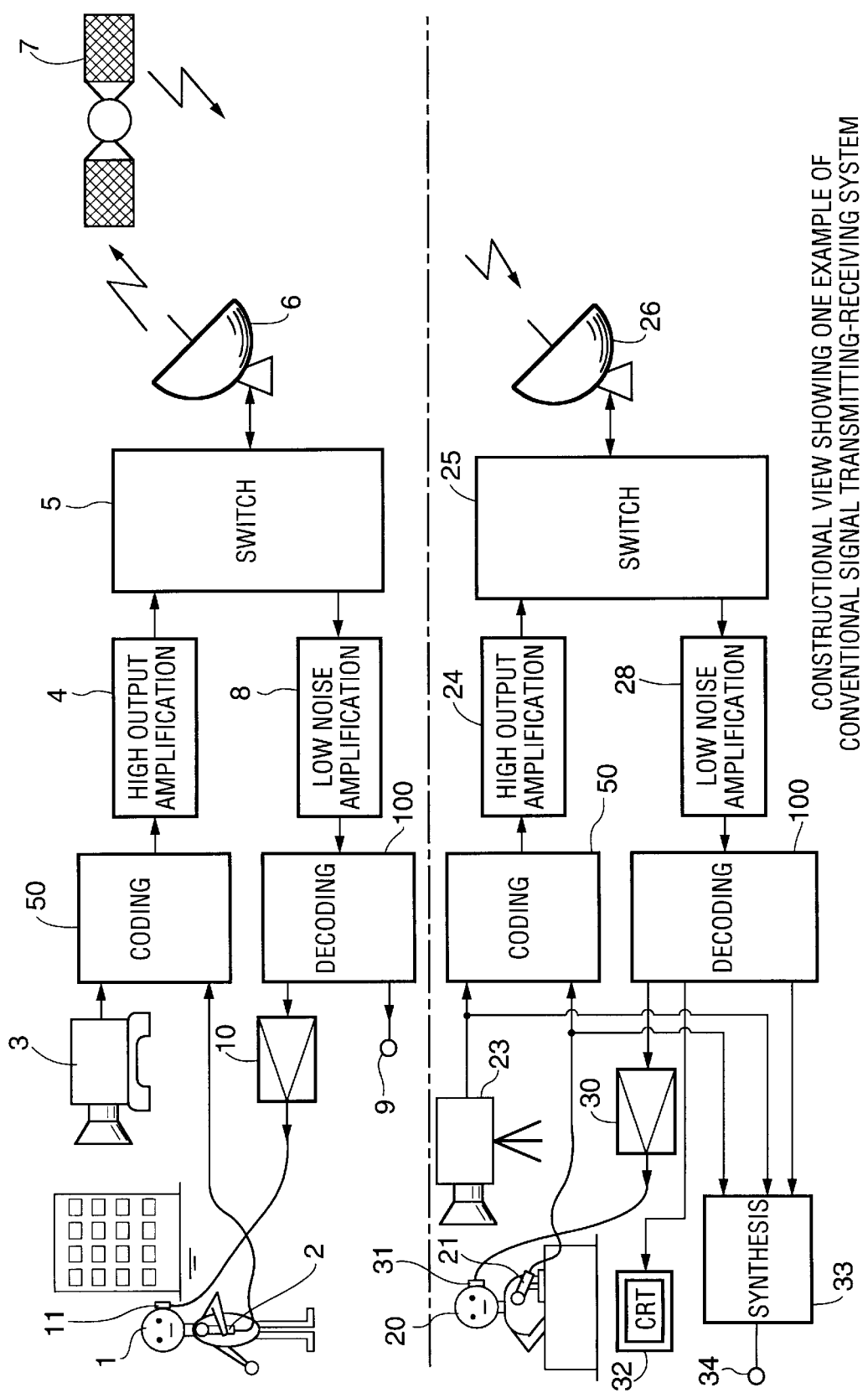
FIG. 8 is a view showing one example of a digital signal transmitting-receiving system.

A signal transmitting-receiving system as shown in FIG. 8 is proposed using an artificial satellite as a relay. This signal transmitting-receiving system shown in this FIG. 8 is called a D-SNG (Digital-Satellite News Gathering) system. In this system, information such as a picture image, a voice, etc. is transmitted and received as digital data. In the signal transmitting-receiving system shown in this FIG. 8, a picture image and a voice on the actual spot can be transmitted to a station studio through an artificial satellite 7, and a reporter 1 located on the actual spot and an announcer 20 located within the studio can verbally communicate with each other over an audio channel. In FIG. 8, a signal transmitting side is shown at the upper part and a signal receiving side is shown at the lower part. In the example of FIG. 8, the actual spot is set to the signal transmitting side and the studio is set to the signal receiving side.

The signal transmitting-receiving system shown in this FIG. 8 is constructed by a signal transmitting side system, the artificial satellite 7 and a signal receiving side system. The signal transmitting side system is constructed by the following constructional elements. A video camera 3 is used to photograph the reporter 1 on the actual spot and a background thereof. A microphone 2 is used to collect a voice of the reporter 1. A coding circuit 50 is used to code a pickup image video signal from the video camera 3 and process an audio signal from the microphone 2. For example, the coding is performed by according to an MPEG (Moving Picture Engineering Group) format, e.g. MPEG-2.

A high output amplifying circuit 4 is used to amplify an output from the coding circuit 50 so as to transmit this output. A switching circuit 5 is used to supply an output of the high output amplifying circuit 4 to an antenna 6 at a signal transmitting time and supply a receiving signal from the antenna 6 to a low noise amplifying circuit 8 described later at a signal receiving time. An antenna 6 is used to transmit and receive signals with the artificial satellite 7 as a relay.

A decoding circuit 100 is used to decode a video signal among an output from the low noise amplifying circuit 8 and regenerate the audio signal. An amplifying circuit 10 is used to current-amplify the audio signal from the decoding circuit 100. An earphone is used to monitor the received audio signal.

The signal receiving side system shown in this FIG. 8 is constructed by the following constructional elements. The coding circuit 50 and the decoding circuit 100 have the same construction as the signal transmitting side. Accordingly, these circuits are designated by the same reference numerals and a detailed explanation thereof is omitted here. The video camera 23 is used to photograph the announcer 20 located within the studio and a background thereof, etc.

A high output amplifying circuit 24, a switching circuit 25, a low noise amplifying circuit 28, an antenna 26, an amplifying circuit 30, an earphone 31 and a microphone 21 respectively have the same functions as the high output amplifying circuit 4, the switching circuit 5, the low noise amplifying circuit 8, the antenna 6, the amplifying circuit 10, the earphone 11 and the microphone 2 in the signal transmitting side system. The CRT 32 is used to monitor a picture image on the actual spot by the announcer.

The synthesis circuit 33 is used to synthesize a pickup image video signal from the video camera 23, a collected audio signal from the microphone 21, a received video signal and an audio signal by a switching operation, etc. and output this synthesized signal from an output terminal 34.

In an operational explanation of the signal transmitting-receiving system, a communication case of the reporter 1 located on the actual spot and the announcer 20 located in the studio through voices is set to a premise when a picture image on the actual spot, a voice of the reporter 1 located on the actual spot, a picture image within the studio, and a voice of the announcer 20 located in the studio are switched in time division and are transmitted for a broadcast.

A video signal of the picture image on the actual spot photographed by the video camera 3 is coded between frames or within a frame in the coding circuit 50. Simultaneously, an audio signal of the voice of the reporter 1 on the actual spot, collected by the microphone 2, is multiplexed in time division together with the video signal in the coding circuit 50. The multiplexed signal is outputted as a radio wave by the antenna 6 through the high output amplifying circuit 4 and the switching circuit 5. This radio wave is received by the antenna 26 on the signal receiving side with the artificial satellite 7 as a relay.

The receiving signal from the antenna 26 is supplied to the decoding circuit 100 through the switching circuit 25 and the low noise amplifying circuit 28. In the decoding circuit 100, the receiving signal is divided into a video signal and an audio signal. The video signal is decoded in the decoding circuit 100. Namely, the decoding circuit 100 decodes the coded video signal of a differential image between frames and decodes a coded video signal within a frame. The video signal and the audio signal from the decoding circuit 100 are supplied to the synthesis circuit 33. Further, the audio signal is supplied to the earphone 31 through the amplifying circuit 30 and the video signal is supplied to the CRT 32.

The video signal of the picture image within the studio from the video camera 23, the audio signal of the voice of the announcer 20, and the received video and audio signals from the decoding circuit 100 are outputted by the synthesis circuit 33 from the output terminal 34 in time division so that these signals are synthesized as video and audio signals for transmission.

The above explanation applies until the voice from the reporter 1 on the actual spot reaches the announcer 20 located within the studio. When the voice from the reporter 1 on the actual spot reaches the announcer 20 located within the studio, the announcer 20 makes a verbal response to this. The verbal response of the announcer 20 is collected by the microphone 21. An audio signal from the microphone 21 is supplied to the coding circuit 50 and is multiplexed together with the video signal picked up by the video camera 23 and coded by this coding circuit 50. Thereafter, the multiplexed signal is supplied to the antenna 26 through the high output amplifying circuit 24 and the switching circuit 25 and is outputted as a radio wave from this antenna 26. This radio wave is relayed by the artificial satellite 7 and is then received by the antenna 6.

The receiving signal from the antenna 6 is supplied to the decoding circuit 100 through the switching circuit 5 and the low noise amplifying circuit 8. Here, the coded video signal is decoded and is then outputted from an output terminal 9. When the CRT is connected to this output terminal, the picture image within the studio can be monitored. On the other hand, the audio signal is supplied to the earphone 11 through the amplifying circuit 10 and is outputted as a voice from this earphone 11. Accordingly, the reporter 1 located on the actual spot and the announcer 20 located within the studio can verbally communicate with each other. Further, if the CRT is connected to the output terminal 9, the reporter 1 and the announcer 20 can also communicate with each other through picture images as well as voices.

Figure 9A:
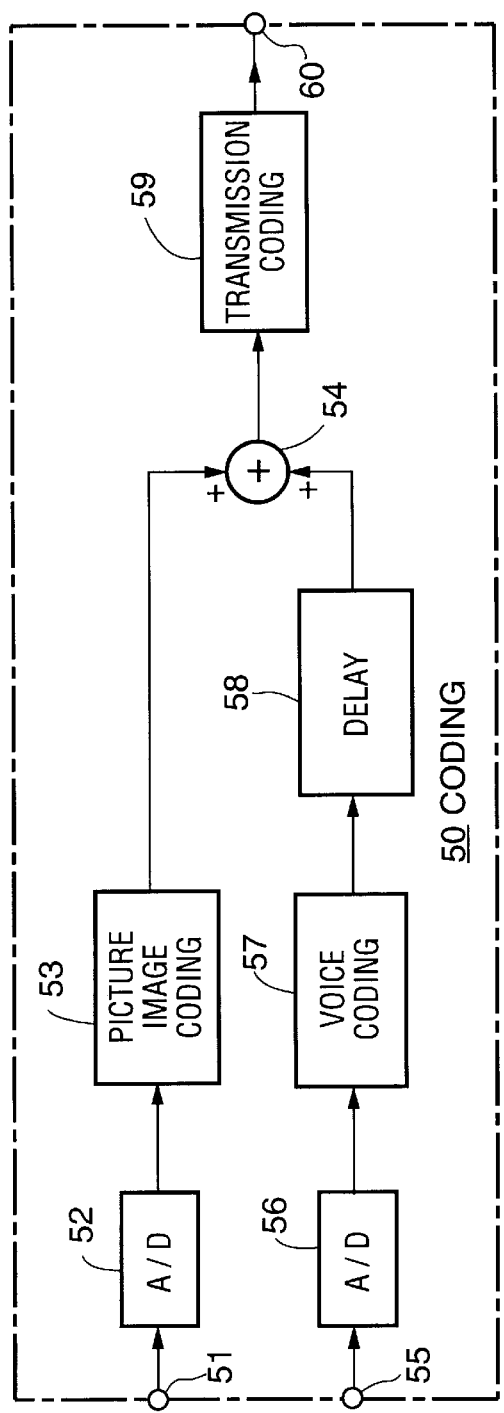
Figure 9B:
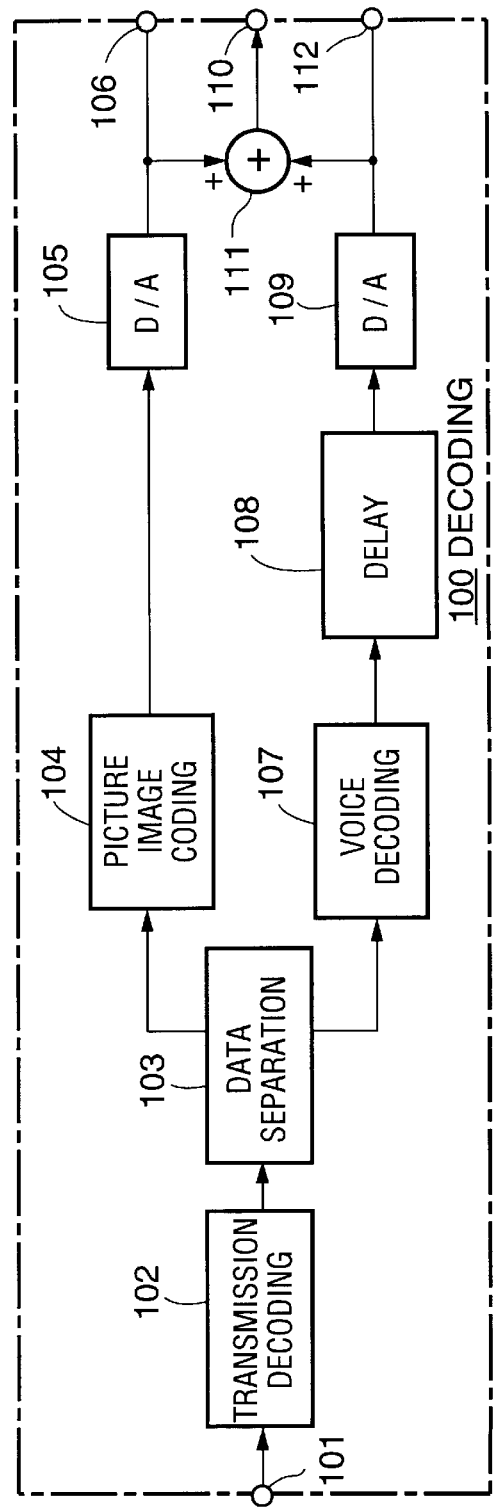

Next, the internal constructions of the coding circuit 50 and the decoding circuit 100 shown in FIG. 8 will be respectively explained with reference to FIGS. 9A and 9B. FIG. 9A shows the internal construction of the coding circuit 50 and FIG. 9B shows the internal construction of the decoding circuit 100.

As shown in FIG. 9A, the coding circuit 50 is constructed by an A-D converter 52, a picture image coding circuit 53, an A-D converter 56, a voice coding circuit 57, a delay circuit 58, an adding circuit 54 and a transmission coding circuit 59. The A-D converter 52 converts a video signal supplied through an input terminal 51 to a digital video signal. The picture image coding circuit 53 codes the digital video signal from this A-D converter 52. The A-D converter 56 converts an audio signal supplied through an input terminal 55 to a digital audio signal. The voice coding circuit 57 codes the digital audio signal from this A-D converter 56. The delay circuit 58 delays coded voice data from this voice coding circuit 57. The adding circuit 54 adds coded picture image data from the picture image coding circuit 53 and the delayed, coded voice data from the delay circuit 58. The transmission coding circuit 59 codes an output of this adding circuit 54 to transmit this output and outputs this coded output through an output terminal 60. For example, the voice coding circuit 57 performs compression processing such as subsampling, etc.

Here, the above delay circuit 58 is arranged to make additional timing of the audio signal to be added to a corresponding video signal coincide with output timing of the video signal from the picture image coding circuit 53. For example, this is because the time taken to code each frame of the video signal is greatly longer than a time taken to code the audio signal.

In the above picture image coding circuit 53, coding between frames and coding within a frame are selectively performed. As is well known, the coding between frames is processing for coding the difference between the video signal at present and a video signal obtained by one frame in the past. The coding within a frame is processing for coding the video signal at present as it is. Here, the term "coding" means that a DCT (Discrete Cosine Transform), a wavelet transform, quantization, variable length coding processing of runlength, and Huffman, etc. are performed with respect to a differential signal between frames and the video signal at present.

The decoding circuit 100 shown in FIG. 9B is constructed by a transmission decoding circuit 102, a data separating circuit 103, a picture image decoding circuit 104, a D-A converter 105, a voice decoding circuit 107, a delay circuit 108, a D-A converter 109 and an adding circuit 111. The transmission decoding circuit 102 decodes a receiving signal coded for transmission supplied through an input terminal 101. The data separating circuit 103 separates an output from this transmission decoding circuit 102 into a video signal and an audio signal. The picture image decoding circuit 104 decodes the video signal from this data separating circuit 103. The D-A converter 105 converts an output from this picture image decoding circuit 104 to an analog video signal and outputs this analog video signal through an output terminal 106. The voice decoding circuit 107 decodes the audio signal from the data separating circuit 103. The D-A converter 109 converts an output of the delay circuit 108 to an analog audio signal and outputs this analog audio signal from an output terminal 112. The adding circuit 111 adds the analog video signal from the D-A converter 105 and the analog audio signal from the D-A converter 109 and supplies this adding signal to a synthesis circuit 33 through an output terminal 110.

Here, the above delay circuit 108 is arranged to make output timing of a corresponding audio signal coincide with output timing of the video signal from the picture image decoding circuit 104. For example, this is because a time taken to decode the video signal every one frame is greatly longer than a time taken to decode the audio signal.

The above picture image decoding circuit 104 performs processing reverse to the coding processing performed by the picture image coding circuit 53 shown in FIG. 9A. Namely, the above picture image decoding circuit 104 decodes the coded video signal (decodes data coded in variable length) and next performs inverse quantization processing with respect to this video signal. Next, IDCT (Inverse Discrete Cosine Transform) processing is performed with respect to the video signal. Thus, a differential signal between frames or a frame video signal is obtained. Then, the picture image decoding circuit 104 further restores an original frame video signal by using the above differential signal between frames, the video signal already decoded, and movement vector data supplied in accordance with this differential signal between frames.

For example, when a B-picture is obtained by the differential coding processing between this B-picture and an I-picture provided by one frame before, data are processed as follows. Namely, a block of the I-picture nearest an object block of the B-picture in level arrangement is detected at a coding time. Further, moving amount data in the x and y directions from the object block of this B-picture to the block of the above I-picture, i.e., movement vector data are obtained. Then, the difference between the object block of the B-picture and the block of the above I-picture is coded and these coded data are multiplexed together with the above movement vector data and are transmitted.

Accordingly, decoding is performed as follows. Namely, in the picture image decoding circuit 104, the above differential data are added to the above block of the I-picture after restoration so that the object block of the above B-picture is restored. The movement vector data are used to extract the restored object block of the I-picture to which the differential data should be added.

Next, a data format used in the signal transmitting-receiving system shown in FIG. 8 will next be explained with reference to FIG. 10. This data format is a format generally called "sky plus".

Figure 10:
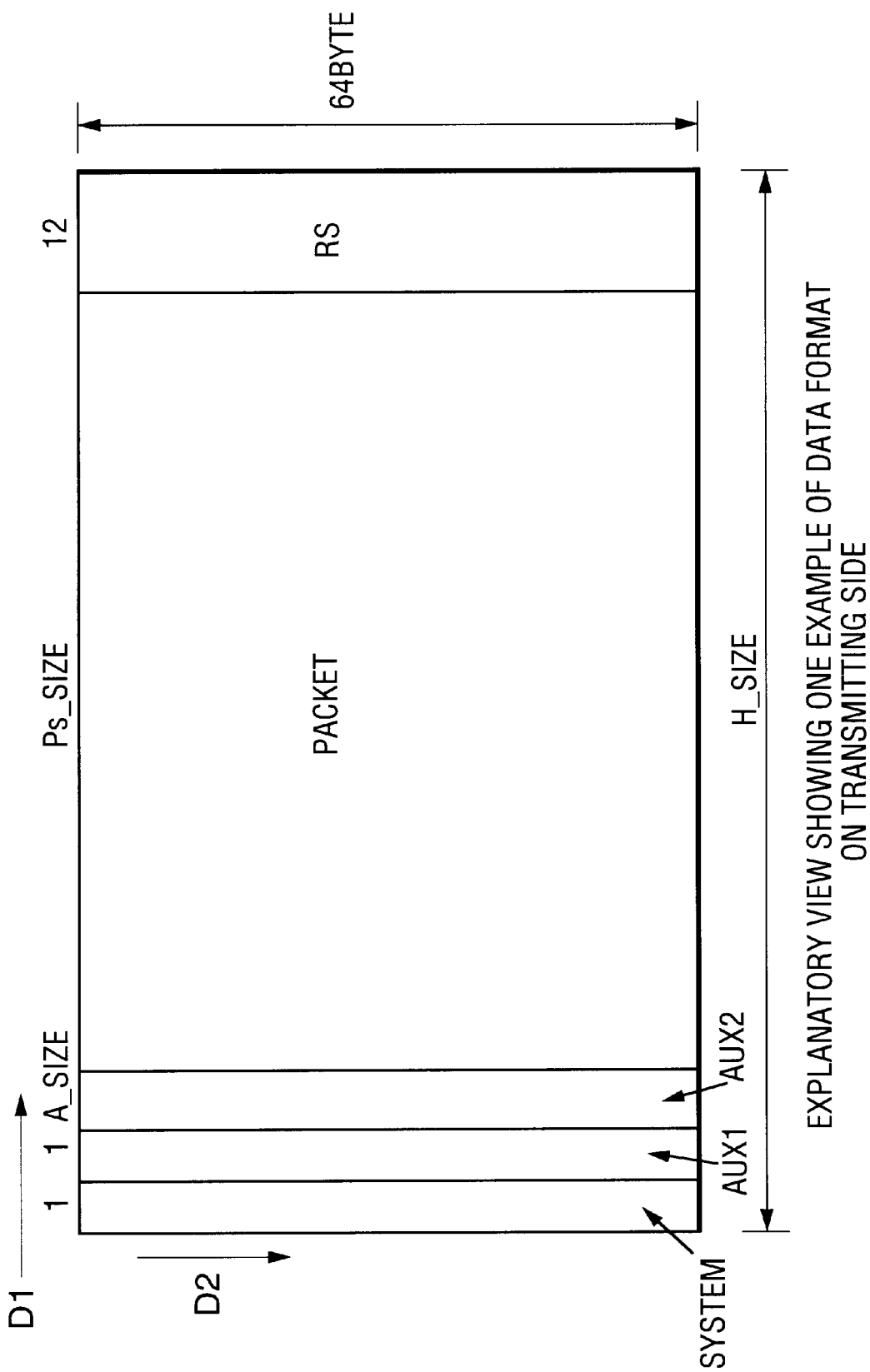
FIG. 10 is an explanatory view showing one example of a data format.

As shown in FIG. 10, transmitted data in one unit are constructed by system data SYSTEM, first AUX data AUX1, second AUX data AUX2, a packet Packet composed of various kinds of data such as a picture image, a voice, etc., and a Read-Solomon code R5. As shown in FIG. 10, a length of each data is set to the following values in a horizontal direction in a packet data unit shown by an arrow D1 of a solid line. Namely, each of the system data SYSTEM and the first AUX data AUX1 is set to 1 byte. The second AUX data AUX2 is set to A size byte and the packet Packet is set to Ps size byte. Further, the Read-Solomon code RS is set to 12 bytes. As shown in FIG. 10, the length of each data is set to 64 bytes in a vertical direction as a transmitting direction shown by an arrow D2 of a solid line.

The value of the A size is prescribed as follows in accordance with a transmission rate (Mbps).

| Transmission rate | A size |
|---|---|
| 6.144 | 8 |
| 12.288 | 4 |
| 24.576 | 2 |
| 49.152 | 1 |
| 40.96 | 1 |

Further, the value of the H size (packet direction) is prescribed as follows in accordance with a compression rate.

| Compression rate | H size |
|---|---|
| 1/2 | 96 |
| 2/3 | 128 |
| 3/4 | 144 |
| 4/5 | 128 |
| 5/6 | 160 |
| 7/8 | 168 |

The relation of the packet size P, the size H in the above packet direction, and the size A of the first AUX data AUX1 is provided as follows:

P size=H size−A size−14

As mentioned above, for example, a time taken to code the video signal in the picture image coding circuit 53 shown in FIG. 9A and a time taken to decode the video signal in the picture image decoding circuit 100 shown in FIG. 9B are considerably longer than a time taken to code and decode an audio signal within a unit of a frame, etc. Accordingly, in the signal transmitting-receiving system shown in FIG. 8, a shift in time between responses of the reporter 1 located on the actual spot and the announcer 20 located in the studio is caused. For example, when the reporter 1 located on the actual spot calls "Hello" to the announcer 20 located in the studio, this audio signal is delayed from this moment by a total time of a processing delay time in the coding circuit 50 of the signal transmitting system and a processing delay time in the decoding circuit 100 of the signal receiving system and is transmitted to the announcer 20 located in the studio. Accordingly, the announcer 20 located within the studio makes a response to this call on the actual spot after this total delay time has passed. When such a state is broadcasted, needless to say, a viewer feels an unnaturalness in the communication between the above two persons.

Here, the degree of delay of information will next be explained with reference to FIG. 11 when this information is transmitted from a signal transmitting station 501 to a signal receiving station 503. Three artificial satellites 7a, 7b and 7c are set to be spaced from each other at an angle of 120 degrees on an orbit of the earth since the number of artificial satellites required at its minimum to cover all radio waves transmitted and received between the artificial satellites and the earth is three.

Figure 11:
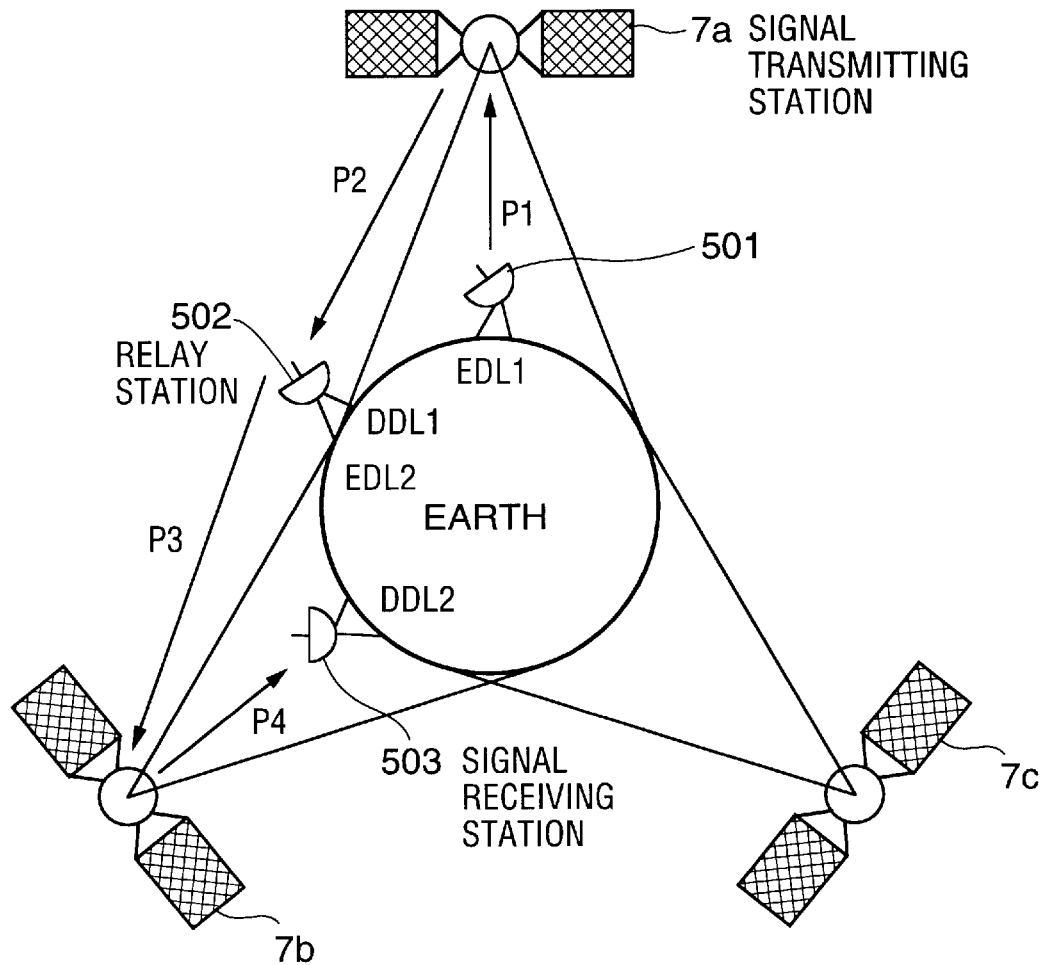
FIG. 11 is an explanatory view for explaining a transmission delay when a digital signal transmitting-receiving system is used.

As shown in this FIG. 11, a communication path from the signal transmitting station 501 to the signal receiving station 503 is constructed by four paths composed of a path P1 from the signal transmitting station 501 to the artificial satellite 7a, a path P2 from the artificial satellite 7a to a relay station 502, a path P3 from the relay station 502 to the artificial satellite 7b, and a path P4 from the artificial satellite 7b to the signal receiving station 503. In the path P1, a delay time EDL1 is caused by coding of the signal transmitting station 501 at its signal transmitting time. In the path P2, a delay time DDL1 is caused by decoding in the relay station 502 at its signal receiving time. In the path P3, a delay time EDL2 is caused by coding in the relay station 502 at its signal transmitting time. In the path P4, a delay time DDL2 is caused by decoding in the signal receiving station 503 at its signal receiving time.

Namely, a total delay time of the communication path from the signal transmitting station 501 to the signal receiving station 503 is equal to EDL1+DDL1+EDL2+DDL2 in total of the delay times in the above respective paths P1 to P4. This is not limited to only the case including the artificial satellites on a communication line, but is similarly formed in the case of communication only on the ground. This is because the delay times are determined by the number of coding circuits 50 and decoding circuits 100 through which information to be transmitted passes. In any case, the delay times are very long in the example shown in FIG. 11. Accordingly, if the signal transmitting station 501 is located on the above actual spot and the signal receiving station 503 is located in the above studio, the reporter 1 located on the actual spot and the announcer 20 located within the studio do not smoothly communicate with each other.

For example, when the reporter 1 asks the announcer 20 a question of "how now?", the time from this moment to the response of the announcer 20 to this question becomes a total of the above delay times and the time until the announcer 20 makes the response after the announcer 20 hears the question from the reporter 1. Accordingly, when this state is broadcasted, there is no room for doubt in viewer's feeling of a very unnatural response and the reporter 1 and the announcer 20 do not smoothly make responses.

B. Summary explanation of the present invention (FIG. 1).

FIG. 1 is an explanatory view for explaining the summary of the present invention. In this FIG. 1, the left-hand side from a left-hand side one-dotted chain line shows a signal transmitting side system. The right-hand side from a right-hand side one-dotted chain line shows a signal receiving side system. For example, the signal transmitting side system is constituted by a vehicle for an on-the-spot telecast arranged on the actual spot. For example, the signal receiving side system is constructed by a studio of a broadcasting station. In this example, a picture image and a voice on the actual spot and a picture image and a voice in the studio are synthesized and an output of this synthesis is used for a broadcast. Accordingly, for example, as shown on the right-hand side in FIG. 1, the picture image on the actual spot and the picture image within the studio can be seen as one picture on a viewer side. Verbal communication between the reporter 1 on the actual spot and the announcer 20 within the studio can be heard simultaneously or in time division by a speaker on the viewer side. Further, in this FIG. 1, an arrow of a thick solid line shows an audio signal (a first audio signal) of a voice of the reporter 1 and an arrow of a thick broken line shows an audio signal of a voice of the announcer 20.

The signal transmitting-receiving system shown in this FIG. 1 is constructed by the signal transmitting side system and the signal receiving side system. The signal transmitting side system is constructed by a signal transmitting circuit T1, a voice processing circuit T2 and a signal receiving circuit T3. Here, the signal transmitting side system has the signal receiving circuit T3, but is called a signal transmitting side system since transmission of the picture image and the voice on the actual spot to the signal receiving side system is the main communication. Further, in this case, the signal receiving circuit T3 is used only in reception of the voice, but can also receive a picture image.

Here, the above signal transmitting circuit T1 includes a coding circuit of a video signal. The above signal receiving circuit T3 includes a decoding circuit of the video signal. In the signal transmitting circuit T1, the video signal is coded and an audio signal is delayed by a delay time caused by this coding. This audio signal is called a first audio signal in the following description. In the voice processing circuit T2, the audio signal is outputted as it is without making output timing of this audio signal coincide with output timing of the video signal. This audio signal is called a second audio signal in the following description. Briefly speaking, the second audio signal is multiplexed with respect to a picture image and the first audio signal outputted from the signal transmitting circuit T1.

The signal receiving side system is constructed by a signal receiving circuit R1, a voice processing circuit R2, a delay circuit R3, a synthesis circuit R4 and a signal transmitting circuit R5. Here, the above signal receiving circuit R1 includes a decoding circuit of a video signal. The above signal transmitting circuit R5 includes a coding circuit of the video signal. For example, the above voice processing circuit R2 is a circuit for processing a voice within the studio. The delay circuit R3 provides a total delay time DEL1+DEL2 of a delay time DEL1 caused by coding of the signal transmitting circuit T1 of the signal transmitting side system and a delay time DEL2 caused by decoding of the signal receiving circuit R1 of the signal receiving side system.

The synthesis circuit R1 synthesizes a decoded video signal from the signal receiving circuit R1 and an audio signal of the voice within the studio and delayed by the total delay time DEL1+DEL2 from the delay circuit R3 by a switching operation, etc. The synthesis circuit R1 then outputs a synthesized signal from an output terminal Tout. The signal receiving side system has the signal transmitting circuit R5, but is called a signal receiving side for reasons similar to the reasons why the signal transmitting side system is set to the signal transmitting side as already explained.

Operation

The next explanation relates to a case in which a picture image and a voice from the actual spot and a picture image and a voice within the studio are synthesized by a switching operation, etc. and are outputted for a broadcast.

A video signal of the picture image on the actual spot and an audio signal of the voice of the reporter 1 on the actual spot are transmitted through the signal transmitting circuit T1. At this time, the audio signal of the voice of the reporter 1 is also supplied to the voice processing circuit T2. Then, after predetermined processing is performed in the voice processing circuit T2, an output of the voice processing circuit T2 is superimposed on an output from the signal transmitting circuit T1. Here, for example, the "predetermined processing" is constructed by voice compression processing almost having no processing delay, etc. Namely, the first audio signal as an audio signal of the voice of the reporter I supplied to the signal transmitting circuit T1 is delayed by the same time as a delay time DEL1 caused by processing a video signal of the same frame supplied to the signal transmitting circuit T1. Thereafter, the first audio signal is transmitted. In contrast to this, the second audio signal as an audio signal supplied to the voice processing circuit T2 is transmitted almost without being delayed. This construction is an important point on the signal transmitting side.

The video signal and the first and second audio signals from the signal transmitting side system are received by the signal receiving circuit R1 of the signal receiving side system. The first audio signal among the receiving signals received by the signal receiving circuit R1 is delayed by a delay time DEL2 caused by decoding the video signal. The decoded video signal and the first audio signal are supplied to the synthesis circuit R4.

The second audio signal among the receiving signals received by the signal receiving circuit R1 is transmitted as a voice to the announcer 20 within the studio. Thus, the announcer 20 within the studio makes a verbal response to a call from the reporter 1 on the actual spot. This response voice is supplied as an audio signal to the voice processing circuit R2, the delay circuit R3 and the signal transmitting circuit R5.

The audio signal supplied to the delay circuit R3 is delayed by a total time of the delay time DEL1 generated in the signal transmitting circuit T1 of the signal transmitting side system and the delay time DEL2 generated in the signal receiving circuit R1 of the signal receiving side system. Thereafter, this audio signal is supplied to the synthesis circuit R4.

The audio signal of the voice of the announcer 20 within the studio is transmitted through the signal transmitting circuit R5. At this time, the audio signal of the voice of the announcer 20 located within the studio is also supplied to the voice processing circuit R2. After predetermined processing is performed in the voice processing circuit R2, an output of the voice processing circuit R2 is superimposed on an output from the signal transmitting circuit RS. Here, similar to the explanation about the signal receiving side system, for example, the "predetermined processing" is constructed by voice compression processing almost having no processing delay, etc.

In this example, it is premised that the signal transmitting circuit RS and the signal transmitting circuit T1 are equal to each other, and the voice processing circuit R2 and the voice processing circuit T2 are equal to each other. Accordingly, the audio signal of the voice of the announcer 20 supplied to the signal transmitting circuit R5 is delayed by the same time as the delay time (DEL1) caused by processing the video signal of the same frame supplied to the signal transmitting circuit R5, and is then transmitted. However, the second audio signal as an audio signal supplied to the voice processing circuit R2 is transmitted almost without being delayed.

Namely, the reporter 1 located on the actual spot and the announcer 20 located within the studio communicate with each other by using the audio signal processed by each of the voice processing circuit T2 and the voice processing circuit R2 and almost having no delay. Namely, the reporter 1 and the announcer 20 communicate with each other by using the first audio signal on the signal transmitting side almost having no delay as shown by an arrow of a thick solid line and the audio signal on the signal receiving side almost having no delay as shown by a thick broken line. Accordingly, the reporter 1 located on the actual spot and the announcer 20 located within the studio can mutually receive a partner's response rapidly.

Then, the receiving signals supplied to the synthesis circuit R4, i.e., the video signal of a picture image and the audio signal of a voice of the reporter 1 on the actual spot are synthesized by a switching operation, etc. with the video signal of a picture image of the announcer 20 within the studio and the audio signal of a voice of the announcer 20 which are delayed by a total time of the delay time DEL1 and the delay time DEL2. This synthesized signal is outputted from the output terminal Tout. Thus, there is no time difference in the verbal communication between the reporter 1 located on the actual spot and the announcer 20 located within the studio. Accordingly, the signal transmitting-receiving system can be set such that no viewer feels an unnaturalness in this communication.

As can be seen from the above explanation, the audio signal on the signal transmitting side and the first audio signal on the signal receiving side almost having no delay are used in the verbal communication of the reporter 1 and the announcer 20. Accordingly, the reporter and the announcer can smoothly verbally communicate with each other between the actual spot and the studio by setting the time difference to zero in the communication of the reporter 1 and the announcer 20. Further, the audio signal of the voice of the announcer 20 located within the studio is delayed by a total time of the delay time DEL1+the delay time DEL2 in the delay circuit R3. Thereafter, this delay signal is synthesized with a receiving signal already delayed by the total time of the delay time DEL1+the delay time DEL2 in the synthesis circuit R4. Accordingly, a communication seemingly having almost no time difference between the reporter 1 on the actual spot and the announcer 20 within the studio can be broadcasted to a viewer. A more detailed example will next be explained as an embodiment form.

C. Explanation of signal transmitting-receiving system (FIG. 2)

FIG. 2 is a constructional view showing an example of a signal transmitting-receiving system as one embodiment form. A video camera 3 is used to photograph the reporter 1 on the actual spot and a background thereof. A microphone 2 is used to collect a voice of the reporter 1. A coding circuit 50 is used to code a pickup image video signal from the video camera 3 and process an audio signal from the microphone 2. For example, the coding is performed by, e.g. MPEG-2 processing.

A high output amplifying circuit 4 is used to amplify an output from the coding circuit 50 so as to transmit this output. A switching circuit 5 is used to supply an output of the high output amplifying circuit 4 to an antenna 6 at a signal transmitting time and supply a receiving signal from the antenna 6 to a low noise amplifying circuit 8 described later at a signal receiving time. An antenna 6 is used to transmit and receive signals with the artificial satellite 7 as a relay.

A decoding circuit 100 is used to decode a video signal among an output from the low noise amplifying circuit 8 and regenerate the audio signal. An amplifying circuit 10 is used to current-amplify the audio signal from the decoding circuit 100. An earphone is used to monitor the received audio signal.

The signal receiving side system shown in this FIG. 2 is constructed by the following constructional elements. The coding circuit 50 and the decoding circuit 100 have the same construction as the signal transmitting side. Accordingly, these circuits are designated by the same reference numerals and a detailed explanation thereof is omitted here. The video camera 23 is used to photograph the announcer 20 located within the studio and a background thereof, etc.

A high output amplifying circuit 24, a switching circuit 25, a low noise amplifying circuit 28, an antenna 26, an amplifying circuit 30, an earphone 31 and a microphone 21 respectively have the same functions as the high output amplifying circuit 4, the switching circuit 5, the low noise amplifying circuit 8, the antenna 6, the amplifying circuit 10, the earphone 11 and the microphone 2 in the signal transmitting side system. The CRT 32 is used to monitor a picture image on the actual spot by the announcer.

The synthesis circuit 33 is used to synthesize a pickup image video signal from the video camera 23, a collected audio signal from the microphone 21, a received video signal and an audio signal by a switching operation, etc. and output this synthesized signal from an output terminal 34.

As can be seen from this FIG. 2, in this embodiment form, a voice processing system 151 different from a main line system is arranged in each of coding circuits 150 of a signal transmitting side system and a signal receiving side system. A voice processing system 201 different from the main line system is arranged in each of decoding circuits 200 of the signal transmitting side system and the signal receiving side system. These voice processing systems 151 and 201 as separate systems are respectively arranged to communicate voices without delay between the reporter 1 located on the actual spot and the announcer 20 located within the studio. Namely, there is almost no processing delay in the voice processing systems 151 and 201. Accordingly, similar to voice communication using a telephone within a country, the reporter 1 located on the actual spot and the announcer 20 located within the studio can verbally communicate with each other. The coding circuit 150 of the signal transmitting side system has an internal construction similar to that of the coding circuit 150 of the signal receiving side system. Accordingly, the same reference numerals are used in these internal constructions. Further, the decoding circuit 200 of the signal transmitting side system has an internal construction similar to that of the decoding circuit 200 of the signal receiving side system. Accordingly, the same reference numerals are used in these internal constructions.

An operation of this signal transmitting-receiving system will next be explained. This explanation relates to a case in which a picture image and a voice from the actual spot and a picture image and a voice within the studio are synthesized by a switching operation, etc. and are outputted for a broadcast.

The video signal of a picture image on the actual spot from a video camera 3 and the audio signal of a voice of the reporter 1 from a microphone 2 are respectively processed by the coding circuit 150. Thereafter, the video signal and the audio signal are outputted as radio waves from an antenna 6 through a high output amplifying circuit 4 and a switching circuit 5. At this time, the audio signal of the voice of the reporter 1 is also supplied to the voice processing circuit 151. Namely, the audio signal of the voice of the reporter 1 is processed by the main line system of the coding circuit 150 and is also supplied to the voice processing circuit 151 different from this main line system. In the following description, the audio signal processed in the main line system is called a main audio signal and the audio signal processed in the voice processing circuit 151 is called a subaudio signal. The main audio signal is delayed by the same time as a delay time caused by the coding processing of the video signal, but the subaudio signal is substantially undelayed. The subaudio signal obtained by performing predetermined processing in the voice processing circuit 151 is superimposed on a signal on a main line within the coding circuit 150. Here, for example, the "predetermined processing" is constructed by voice compression processing almost causing no processing delay, etc.

The video signal, the main audio signal and the subaudio signal from the signal transmitting side system are received by an antenna 26 of the signal receiving side system. Thereafter, these signals are supplied as receiving signals to a decoding circuit 200 through a switching circuit 25 and a low noise amplifying circuit 28. The main audio signal among the receiving signals supplied to the decoding circuit 200 is delayed by the same time as a delay time caused by decoding the video signal. The subaudio signal is outputted as it is without being delayed.

The subaudio signal from the decoding circuit 200 is outputted as a voice from an earphone 31 mounted onto an announcer 20 within the studio through an amplifying circuit 30. The video signal from the decoding circuit 200 is supplied to a CRT 32 and is displayed as an image on a tube screen of this CRT. Thus, the announcer 20 located within the studio can monitor a picture image and a voice from the actual spot. The voice outputted from the earphone 31 has almost no delay, but the picture image displayed in the CRT 32 is delayed so that there is a shift in time between the voice and the picture image. Here, the voice communication between the studio and the actual spot is important. The picture image and the subaudio signal from the decoding circuit 200 are supplied to a synthesis circuit 33.

On the other hand, the voice of the announcer 20 located within the studio and verbally communicating with the reporter 1 located on the actual spot is collected by a microphone 21 and is supplied to the coding circuit 150 as an audio signal and is also supplied to a delay circuit 202. Further, picture images of the announcer 20 located within the studio and a background thereof, etc. are picked up by a video camera 23 and are supplied to the coding circuit 150 as a video signal and are also supplied to the delay circuit 202. Here, the delay circuit 202 delays each of the audio signal from the above microphone 21 and the video signal from the above video camera 23 by a time equal to a total time of a delay time caused by coding the video signal in the coding circuit 150 of the signal transmitting side system and a delay time caused by decoding the video signal in the decoding circuit 200 of the signal receiving side system.

This delaying operation is performed to make timing positions of the picture image and the audio signal of the signal receiving side system coincide with timing positions of the picture image and the audio signal from the signal transmitting side system. The picture image and the audio signal from the actual spot and the picture image and the audio signal from the studio are synthesized in the synthesis circuit 33. For example, a synthesis method is constructed by switching the picture images and the audio signals using a switcher and mixing signals of the picture images and the audio signals with each other using a picture image special effect device, etc. For example, as shown in FIG. 1, the picture image on the actual spot and the picture image within the studio are synthesized as one picture and the voice on the actual spot and the voice in the studio are synthesized as one voice. These synthesized picture images and audio signals are broadcasted. Accordingly, a viewer can see a state in which situations of the actual spot and the studio are displayed on the screen of a monitor. Further, the viewer can hear the communication between the reporter 1 located on the actual spot and the announcer 20 located in the studio without any apparent voice delay.

D. Explanation of coding circuit and decoding circuit shown in FIGS. 2 and 3.

FIG. 3A is a constructional view showing an internal construction of the coding circuit 150 shown in FIG. 2. FIG. 3B is a constructional view showing an internal construction of the decoding circuit 200 shown in FIG. 2.

Explanation of coding circuit 150:

As shown in FIG. 3A, the coding circuit 150 is constructed by an A-D converter 52, a picture image coding circuit 53, an A-D converter 56, a voice coding circuit 57, a delay circuit 58, adding circuits 54 and 62 and a transmission coding circuit 59. The A-D converter 52 converts a video signal supplied through an input terminal 51 to a digital video signal. The picture image coding circuit 53 codes the digital video signal from this A-D converter 52. The A-D converter 56 converts an audio signal supplied through an input terminal 55 to a digital audio signal. The voice coding circuit 57 codes the digital audio signal from this A-D converter 56. The delay circuit 58 delays coded voice data from this voice coding circuit 57. The adding circuit 54 adds coded picture image data from the picture image coding circuit 53 and the delayed, coded voice data from the delay circuit 58. The transmission coding circuit 59 codes an output of the adding circuits 54 and 62 to transmit this output and outputs this coded output through an output terminal 60. For example, the voice coding circuit 57 performs compression processing such as subsampling, etc.

Here, the above delay circuit 58 is arranged to make additional timing of the audio signal to be added to a corresponding video signal coincide with output timing of the video signal from the picture image coding circuit 53. For example, this is because the time taken to code each frame of the video signal is greatly longer than a time taken to code the audio signal.

In the above picture image coding circuit 53, coding between frames and coding within a frame are selectively performed. As is well known, the coding between frames is processing for coding the difference between the video signal at present and a video signal obtained by one frame in the past. The coding within a frame is processing for coding the video signal at present as it is. Here, the term "coding" means that a DCT (Discrete Cosine Transform), a wavelet transform, quantization, variable length coding processing of as runlength, Huffman, etc. are performed with respect to a differential signal between frames and the video signal at present.

The internal construction of the coding circuit 150 shown in FIG. 3A is different from the internal construction of the coding circuit 50 shown in FIG. 9A in that a voice processing circuit 151 as a separate system composed of a voice processing circuit 61 and an adding circuit 62 is added in FIG. 3A. Namely, the voice processing circuit 151 explained with reference to FIG. 2 is constructed by the voice processing circuit 61 and the adding circuit 62 shown in this FIG. 3A.

The audio signal supplied through the input terminal 55 and converted to a digital audio signal in the A-D converter 56 is also supplied to the voice processing circuit 61. The voice processing circuit 61 performs converting processing at a simple sample rate when it is necessary to perform simple voice processing such as preemphasis, etc. and reduce an information amount. Here, for example, the sample rate is converted by converting the audio signal sampled at 48 KHz to an audio signal sampled at 24 KHz, and shortening a bit length of digital voice data obtained by sampling, etc. (simple thinning-out of a lower bit, etc.)

In the adding circuit 62, the digital voice data from the voice processing circuit 61 are added to the picture image and voice data from the adding circuit 54. An adding output from the adding circuit 62 is supplied to the transmission coding circuit 59. Digital picture image and voice data from the adding circuit 54 are delayed by a processing delay time in the picture image coding circuit 53 with respect to the digital voice data from the voice processing circuit 61. This delay is important. The digital voice data from this voice processing circuit 61 are used to communicate between the reporter 1 located on the actual spot and the announcer 20 located within the studio.

Explanation of decoding circuit 200:

The decoding circuit 100 shown in FIG. 3B is constructed by a transmission decoding circuit 102, a data separating circuit 103, a picture image decoding circuit 104, a D-A converter 105, a voice decoding circuit 107, a delay circuit 108, a D-A converter 109 and an adding circuit 111. The transmission decoding circuit 102 decodes a receiving signal coded for transmission supplied through an input terminal 101. The data separating circuit 103 separates an output from this transmission decoding circuit 102 into a video signal and an audio signal. The picture image decoding circuit 104 decodes the video signal from this data separating circuit 103. The D-A converter 105 converts an output from this picture image decoding circuit 104 to an analog video signal and outputs this analog video signal through an output terminal 106. The voice decoding circuit 107 decodes the audio signal from the data separating circuit 103. The D-A converter 109 converts an output of the delay circuit 108 to an analog audio signal and outputs this analog audio signal from an output terminal 112. The adding circuit 111 adds the analog video signal from the D-A converter 105 and the analog audio signal from the D-A converter 109 and supplies this adding signal to a synthesis circuit 33 through an output terminal 110.

Here, the above delay circuit 108 is arranged to make output timing of a corresponding audio signal coincide with output timing of the video signal from the picture image decoding circuit 104. For example, this is because a time taken to decode the video signal every one frame is greatly longer than a time taken to decode the audio signal.

The above picture image decoding circuit 104 performs processing reverse to the coding processing performed by the picture image coding circuit 53 shown in FIG. 3A. Namely, the above picture image decoding circuit 104 decodes the coded video signal (decodes data coded in variable length) and next performs inverse quantization processing with respect to this video signal. Next, IDCT (Inverse Discrete Cosine Transform) processing is performed with respect to the video signal. Thus, a differential signal between frames or a frame video signal is obtained. Then, the picture image decoding circuit 104 further restores an original frame video signal by using the above differential signal between frames, the video signal already decoded, and movement vector data supplied in accordance with this differential signal between frames.

For example, when a B-picture is obtained by the differential coding processing between this B-picture and an I-picture provided by one frame before, data are processed as follows. Namely, a block of the I-picture nearest an object block of the B-picture in level arrangement is detected at a coding time. Further, moving amount data in the x and y directions from the object block of this B-picture to the block of the above I- picture, i.e., movement vector data are obtained. Then, the difference between the object block of the B-picture and the block of the above I-picture is coded and these coded data are multiplexed together with the above movement vector data and are transmitted.

Accordingly, decoding is performed as follows. Namely, in the picture image decoding circuit 104, the above differential data are added to the above block of the I-picture after restoration so that the object block of the above B-picture is restored. The movement vector data are used to extract the restored object block of the I-picture to which the differential data should be added.

The internal construction of the decoding circuit 200 shown in FIG. 3B is different from that of the decoding circuit 100 shown in FIG. 9B in that a voice processing circuit 201 in a separate system composed of a voice processing circuit 113 and an output terminal 114 is added in FIG. 3B. Namely, the voice processing circuit 201 explained with reference to FIG. 2 is constructed by the voice processing circuit 113 and the output terminal 114 shown in this FIG. 3B.

An operation of the decoding circuit 200 only in portions different from those in FIG. 9B will be explained. A receiving signal supplied through the input terminal 101 is decoded in the transmission decoding circuit 102. An output from this transmission decoding circuit 102 is supplied to the data separating circuit 103. In this data separating circuit 103, the output from the transmission decoding circuit 102 is separated into three signals composed of a video signal, a main audio signal and a subaudio signal. The subaudio signal from the data separating circuit 103 is supplied to the voice processing circuit 113. In this voice processing circuit 113, for example, deemphasis processing of the subaudio signal, etc. are performed and this subaudio signal is then outputted through the output terminal 114.

E. Explanation of the data separating circuit shown in FIGS. 3 and 4.

FIG. 4 is a constructional view showing an example of an internal construction of the data separating circuit 103 shown in FIG. 3. As shown in this FIG. 4, the data separating circuit 103 is constructed by a synchronous signal detecting circuit 103b, a clock detecting circuit 103c, a write timing control circuit 103d, a picture image FIFO (First-In First-Out) memory 103e for a video signal, a FIFO memory 103g for a main audio signal, a FIFO memory 103i for a subaudio signal, a FIFO memory 103k for data, and a read timing control circuit 103n. The synchronous signal detecting circuit 103b detects a synchronous signal from decoded data supplied through an input terminal 103a. The clock detecting circuit 103c detects a clock signal from the decoded data. The write timing control circuit 103d outputs each of write control signals for a picture image, a main audio signal, a subaudio signal and data on the basis of the detected synchronous signal from the synchronous detecting circuit 103b and the clock signal from the clock detecting circuit 103c. The read timing control circuit 103n supplies a read control signal to each of the above FIFO memories 103e, 103g, 103i and 103k.

An operation of this data separating circuit will next be explained. Received data are supplied to each of the FIFO memory 103e for a video signal, the FIFO memory 103g for a main audio signal, the FIFO memory 103i for a subaudio signal, and the FIFO memory 103k for data through the input terminal 103a. The received data are also supplied to the synchronous detecting circuit 103b and the clock detecting circuit 103c. In the synchronous detecting circuit 103b, a synchronous signal is extracted from the received data. The extracted synchronous signal is supplied to the write timing control circuit 103d. In the clock detecting circuit 103c, a clock signal is extracted from the received data. The extracted clock signal is supplied to the write timing control circuit 103d.

The write timing control circuit 103d generates write control signals active only in a period of the video signal, a period of the main audio signal, a period of the subaudio signal and a period of data among received signals on the basis of the synchronous signal from the synchronous detecting circuit 103b and the clock signal from the clock detecting circuit 103c. The write timing control circuit 103d supplies these write control signals to the FIFO memory 103e for a video signal, the FIFO memory 103g for a main audio signal, the FIFO memory 103i for a subaudio signal, and the FIFO memory 103k for data, respectively. Accordingly, only the video signal among the received signals is written to the FIFO memory 103e for a video signal. Only the main audio signal among the received signals is written to the FIFO memory 103g for a main audio signal. Only the subaudio signal among the received signals is written to the FIFO memory 103i for a subaudio signal. Only the data among the received signals are written to the FIFO memory 103k for data. The video signal, the main audio signal, the subaudio signal and the data respectively written to the FIFO memories 103e, 103g, 103i and 103k are respectively read therefrom by the read control signal from the read timing control circuit 103n and are respectively outputted from output terminals 103f, 103h, 103j and 103m.

F. Data format at transmitting time (FIG. 5)

FIG. 5 is an explanatory view showing a data format at a transmitting time. As shown in FIG. 5, transmitted data in one unit are constructed by system data SYSTEM, first AUX data AUX1, second AUX data AUX2, a packet composed of various kinds of data such as a picture image, a voice, etc., and a Read-Solomon code R5. As shown in FIG. 5, a length of each data is set to the following values in a horizontal, i.e. a packet direction (as viewed in FIG. 5) in the packet data unit. Namely, each of the system data and the first AUX data AUX1 is set to 1 byte. The data format at the transmitting time shown in this FIG. 5 is different from the data format shown in FIG. 10 in that an area for 5 bytes of data DATA as an option such as a title, comments, etc., an area for 128 bytes of video signal data VIDEO, an area for 20 bytes of an audio signal AUDIO, and an area for 12 bytes of a Read-Solomon code R5 are arranged in FIG. 5. More particularly, in the area AUDIO, an area for 10 bytes of the main audio signal A1 and an area for 10 bytes of the subaudio signal A2 are arranged. Here, a main audio signal A1 corresponds to the main audio signal explained with reference to FIG. 4 and a subaudio signal A2 corresponds to the subaudio signal explained with reference to FIG. 4. The main audio signal A1 is a delayed audio signal and the subaudio signal A2 is a nondelayed audio signal. The length of each data is set to 64 bytes in a vertical direction (as viewed in FIG. 5) as a transmitting direction. The data format is thus 64 bytes by 168 bytes.

As explained above, in this embodiment form, the areas of the main audio signal A1 delayed in conformity with the delay of a picture image and the undelayed subaudio signal A2 are arranged as a transmission format as shown in FIG. 5. The respective data shown in FIG. 5 are separated from received data of the above format on the signal receiving side and the undelayed subaudio signal is supplied to the announcer 20 located within the studio. Further, a responsive audio signal of the announcer and a video signal within the studio are delayed by a total time of the delay time caused by the coding processing in the signal transmitting side system and the delay time caused by the decoding processing in the signal receiving side system. The delayed video and audio signals are synthesized with the video signal of a picture image on the actual spot and the audio signal of a voice on the actual spot transmitted from the signal transmitting side system and are used for a broadcast.

Accordingly, a program can be provided to a viewer in a state in which there is no apparent time difference caused by the processing delay in the communication between the reporter 1 located on the actual spot and the announcer 20 located in the studio.

Similar to the above case, the audio signal from the studio can be also transmitted to the reporter 1 on the actual spot. Accordingly, no communication between the reporter 1 located on the actual spot and the announcer 20 located in the studio is influenced by the processing delay so that the reporter 1 and the announcer 20 can smoothly communicate with each other.

G. Explanation of signal transmitting-receiving system (FIG. 6)

FIG. 6 is a constructional view showing a second embodiment form of the present invention. In this FIG. 6, portions corresponding to those in FIG. 2 are designated by the same reference numerals and a detailed explanation thereof is omitted here.

The greatest difference between the signal transmitting-receiving system shown in this FIG. 6 and the signal transmitting-receiving system shown in FIG. 2 is as follows. The main audio signal and the subaudio signal are used in the signal receiving side system shown in FIG. 2. The subaudio signal is transmitted as it is. The main audio signal is transmitted after the main audio signal is delayed to synchronize the main audio signal with a video signal. However, only the main audio signal is used in the signal transmitting-receiving system shown in FIG. 6. This main audio signal is transmitted as it is without delaying this main audio signal. The undelayed main audio signal is used in the verbal communication between the actual spot and the studio in the signal receiving side system. However, the main audio signal is delayed by a processing delay time caused by coding and decoding the video signal when the main audio signal is transmitted for broadcast to a viewer.

Concretely, the internal constructions of a coding circuit 250 and a decoding circuit 300 in the signal transmitting side system and the signal receiving side system are respectively different from each other. Further, a delay circuit 301 is arranged at an output stage of the decoding circuit 300 of the signal receiving side system. As mentioned above, this delay circuit 301 is arranged to delay the main audio signal by a total time of a delay time caused by processing a video signal provided by the coding circuit 250 of the signal transmitting side system and a delay time caused by processing a video signal provided by the decoding circuit 300 of the signal receiving side system.

The case using the delay circuit 202 and the synthesis circuit 304 is explained in the signal transmitting-receiving system shown in FIG. 2. However, this signal transmitting-receiving system shown in FIG. 6 uses delay circuits 303 and 304, an adding circuit 305 and a switch 306. Namely, a video signal from a video camera 23 is delayed by the above total time in the delay circuit 303 and an audio signal from a microphone 21 is delayed by the above total time in the delay circuit 304. The video signal from the delay circuit 303 and the audio signal from the delay circuit 304 are added (multiplexed) to each other in the adding circuit 305. An adding signal from this adding circuit 305 is supplied to one fixed contact 306a of the switch 306.

On the other hand, an audio signal from the decoding circuit 300 is delayed by the above total time in the delay circuit 301 and is then supplied to an adding circuit 302. A video signal from the decoding circuit 300 is also supplied to the adding circuit 302. An adding signal from the adding circuit 302 is supplied to the other fixed contact 306b of the switch 306. A movable contact 306c of this switch 306 is connected to one fixed contact 306a or the other fixed contact 306b by a switching signal from a transmitting control system of an unillustrated signal receiving system. Thus, the picture image and the audio signal from the actual spot and the picture image and the audio signal within the studio are outputted from an output terminal 307 in time division and are transmitted from an unillustrated transmitting system.

The above contents are briefly summarized as follows. Namely, the audio signal of a voice of the reporter 1 on the actual spot is transmitted from the signal transmitting side system without being delayed. In contrast to this, the video signal of a picture image on the actual spot is delayed by the coding processing in the coding circuit 250 and is then transmitted from the signal transmitting side system. The transmitted video and audio signals are received by an antenna 26 of the signal receiving side system and are supplied to the decoding circuit 300 through a switching circuit 25 and a low noise amplifying circuit 28. In the decoding circuit 300, the received video signal is decoded, but is delayed by a time taken to perform this decoding processing. The received audio signal is decoded in this decoding circuit 300, but this decoding processing incurs almost no processing delay such as simple deemphasis processing, interpolating processing, etc. This received audio signal is supplied to an amplifying circuit 30 as it is and is outputted as a voice from an earphone 31 of the announcer 20 located within the studio.

The audio signal of a voice of the announcer 20 located within the studio is similarly transmitted without being delayed. In the signal transmitting side system, processing similar to the above case is performed. Thereafter, this audio signal is supplied to an earphone 11 of the reporter 1 through an amplifying circuit 10 and is outputted as a voice from this earphone 11. Accordingly, the reporter 1 on the actual spot and the announcer 20 in the studio can communicate with each other through a normal voice channel having no responsive delay. At this time, a picture image displayed on the tube screen of a CRT 32 is delayed in time with respect to the voice of the reporter 1 on the actual spot heard by the announcer 20. However, there is no problem about this delay. This is because the reporter 1 on the actual spot and the announcer 20 within the studio are communicating with each other only using their undelayed voices.

In the delay circuit 301, the received audio signal is delayed by a total time of a delay time caused by the coding processing and a delay time caused by the decoding processing. In contrast to this, the received video signal is outputted as it is. Accordingly, the received video signal and the received audio signal corresponding to this received video signal are added to each other in the adding circuit 302. The audio and video signals of the picture image within the studio are respectively delayed by the same time as the delay time of the above delay circuit 301 by the delay circuits 303 and 304. The audio and video signals from the delay circuits 303 and 304 are added to each other in the adding circuit 305 and are then supplied to one fixed contact 306a of the switch 306. Accordingly, the picture image and the voice on the actual spot and the picture image and the voice in the studio are respectively aligned with each other in positions on a time axis and are then synthesized for transmission by the switch 306. This synthesized signal is then broadcasted.

H. Explanation of coding circuit and decoding circuit shown in FIGS. 6 and 7A and 7B.

FIG. 7A is a constructional view showing an example of an internal construction of the coding circuit 250 shown in FIG. 6. FIG. 7B is a constructional view showing an example of an internal construction of the decoding circuit 300 shown in FIG. 6. In FIGS. 7A and 7B, portions corresponding to those in FIGS. 3A and 3B are designated by the same reference numerals and a detailed explanation thereof is omitted here.

The coding circuit 250 shown in FIG. 7A is different from the coding circuit 150 shown in FIG. 3A in that the delay circuit 58, the voice processing circuit 61 and the adding circuit 62 used in the coding circuit 150 shown in FIG. 3A are not used in the coding circuit 250 shown in FIG. 7A. Namely, in this example, as already explained with reference to FIG. 6, only a main audio signal is used and is transmitted as it is without delaying this main audio signal by a delay time caused by processing a video signal.

The decoding circuit 300 shown in FIG. 7B is different from the decoding circuit 200 shown in FIG. 3B in that the voice processing circuit 113, the delay circuit 108 and the adding circuit 111 used in the decoding circuit 200 shown in FIG. 3B are not used in the decoding circuit 300 shown in FIG. 7B. Namely, in this example, an analog video signal from a D-A converter 105 is supplied to the CRT 32 and the adding circuit 302 shown in FIG. 6 through output terminals 106a and 106b, respectively. An analog audio signal from a D-A converter 109 is supplied to the amplifying circuit 30 and the delay circuit 301 shown in FIG. 6 through output terminals 110a and 110b, respectively.

As mentioned above, in this example, an audio signal is treated in one system in the signal transmitting-receiving system and is transmitted without being delayed in the signal transmitting side system. In the signal receiving side system, a received audio signal is delayed by a total time of a delay time caused by the coding processing of the signal transmitting side system and a delay time caused by the decoding processing of the signal receiving side system. Accordingly, the number of systems of the audio signal can be minimized to one and communication using voices can be smoothly performed between the actual spot and the studio.

Effects obtained by first and second embodiment forms in example shown in FIG. 11:

As explained with reference to FIG. 11, a total delay time in transmission of messages using voices from a signal transmitting station 501 to a signal receiving station 503 is equal to EDL1+DDL1+EDL2+DDL2. However, when the signal transmitting-receiving system explained as each of the above first and second embodiment forms is used in the signal transmitting station 501, a relay station 502 and the signal receiving station 503 mentioned above, no delay except for delays caused by distances is caused with respect to a communicated voice itself. This is because the above delay times EDL1, DDL1, EDL2 and DDL2 are respectively the same delay times as delay times caused by coding and decoding a video signal and delaying a final audio signal for a broadcast. Namely, this is because no audio signal used in communication is delayed to make this audio signal coincide with the video signal. Accordingly, there is also no delay caused by the system in the communication using voices in the example shown in FIG. 11.

In the above first and second embodiment forms, only a so-called down-converting operation for reducing a sampling frequency from 48 KHz to 24 Khz may be performed in the voice coding processing in each of the coding circuits. In this case, the voice quality is reduced since the information amount is reduced. However, the transmission speed of voice information can be correspondingly set to a high speed.

In accordance with the present invention mentioned above, a picture image in a first spot and a voice of a person located in this first spot are transmitted by a signal transmitting side system having a signal transmitting-receiving function to a signal receiving side system having a signal transmitting-receiving function and located in a second spot. The picture image and the voice in the first spot and a picture image in the second spot and a voice of a person located in this second spot are synthesized in the signal receiving side system and are transmitted from this signal receiving side system. The voice of the person located in the second spot is transmitted to the signal receiving side system to communicate the voices between the person located in the first spot and the person located in the second spot and no delay processing for making positions of the voices coincide with positions of the picture images on a time axis is performed in the communication between the person located in the first spot and the person located in the second spot. Accordingly, no time delay is caused in the communication between a person located in the first spot and a person located in the second spot. Further, the voices can coincide with the picture images in position on the time axis.

Although the present invention has been shown and described with respect to preferred embodiments, various changes and modifications are deemed to lie within the spirit and scope of the invention as claimed.

What is claimed is:

1. A signal transmitting-receiving system comprising:
   (a) a signal transmitting side system including:
      first voice processing means for processing a first audio signal with substantially no delay time to produce a second audio signal;

first signal transmitting means for transmitting a multiplexed signal composed of a first video signal with a first delay time due to compression processing, the first audio signal delayed by the first delay time to be time coincident with the first video signal, and the second audio signal; and first signal receiving means for receiving at least audio signals; and (b) a signal receiving side system including:

second signal receiving means for receiving the multiplexed first video signal, the first audio signal and the second audio signal from the first signal transmitting means, the second signal receiving means including means for extension processing the received first video signal;

second signal transmitting means for transmitting a third audio signal from a location of the signal receiving side system to the first signal receiving means;

delay means for delaying the third audio signal and a second video signal at the location of the signal receiving side system by a time equal to a total delay time obtained by adding the first delay time and a second delay time caused by extension processing with respect to the first video signal in the second signal receiving means; and synthesis means for synthesizing the first video signal and the first audio signal from the second signal receiving means and the second video signal and the third audio signal from the delay means to produce a composite of the first video signal, the first audio signal, the second video signal, and the third audio signal with substantially no relative time delay between them, wherein the second audio signal and the third audio signal provide undelayed real-time verbal communication between a location of the signal transmitting side system and the location of the signal receiving side system.

2. A signal transmitting-receiving system as set forth in claim 1, wherein the first video signal is a digital video signal and the compression processing and the extension processing of the first video signal is performed according to the MPEG-2 format of the Motion Picture Experts Group.

3. A signal transmitting-receiving system comprising:

(a) a signal transmitting side system including:

first signal transmitting means for transmitting a first video signal and a first audio signal; and first signal receiving means for receiving at least an audio signal;

(b) a signal receiving side system including:

second signal receiving means for receiving the first video signal and the first audio signal from the first signal transmitting means;

second signal transmitting means for transmitting a second audio signal from a location of the signal receiving side system to the first signal receiving means;

first delay means for delaying the second audio signal and a second video signal at the location of the signal receiving side system by a time equal to a total delay time obtained by adding a first delay time caused by compression processing with respect to the first video signal in the first signal transmitting means and a second delay time caused by extension processing with respect to the first video signal in the second signal receiving means;

second delay means for delaying the first audio signal from the second signal receiving means by the time equal to the total delay time; and synthesis means for synthesizing the first video signal from the second signal receiving means, the first audio signal from the second delay means, and the second video signal and the second audio signal from the first delay means to produce a composite audio and video signal which, when reproduced to a viewer, has no apparent relative time displacement between images and sound, wherein the first audio signal and the second audio signal provide undelayed real-time verbal communication between a location of the signal transmitting side system and the location of the signal receiving side system.

4. A signal transmitting-receiving system as set forth in claim 3, wherein the first video signal is a digital video signal and the compression processing and the extension processing of the first video signal is performed according to the MPEG-2 format of the Motion Picture Experts Group.

5. A signal transmitting-receiving method comprising the steps of:

compression processing at a first location a first video signal, the compression processing introducing a first delay time;

transmitting from the first location a multiplexed signal composed of the compression processed first video signal, a first audio signal delayed in time to be coincident with this compression processed first video signal, and a second audio signal identical to the first audio signal but not delayed in time to be coincident with the first video signal;

receiving the multiplexed signal at a second location and extracting the transmitted compression processed first video signal, the first audio signal and the second audio signal;

extension processing at the second location the compression processed first video signal and the first audio signal, the extension processing introducing a second delay time to the first video signal;

delaying the extension processed first audio signal by the second delay time;

transmitting from the second location to the first location a third audio signal;

receiving at the first location the transmitted third audio signal;

delaying at the second location the third audio signal and a second video signal by a time equal to a total delay time obtained by adding the first delay time and the second delay time; and synthesizing the extension processed first video signal and the extension processed and delayed first audio signal with the delayed second video signal and the delayed third audio signal to produce a synthesized signal which has no relative delay times between the first video signal, the first audio signal, the second video signal, and the third audio signal, wherein the second audio signal and the third audio signal provide undelayed real-time verbal communication between the first location and the second location.

6. A signal transmitting-receiving system as set forth in claim 5, wherein the first video signal is a digital video signal and the compression processing and the extension processing of the first video signal is performed according to the MPEG-2 format of the Motion Picture Experts Group.

7. A signal transmitting-receiving method comprising the steps of:

transmitting from a first location a first video signal, which has been compression processed to incur a first delay time, and a first audio signal;

receiving at a second location the transmitted first video signal and the first audio signal and extension processing the first video signal so as to incur a second delay time;

transmitting an undelayed second audio signal from the second location to the first location;

receiving the undelayed second audio signal at the first location;

delaying at the second location the second audio signal, a second video signal, and the received first audio signal by a time equal to the total delay time of the sum of the first delay time and the second delay time; and synthesizing together the first video signal received at the second location, the delayed first audio signal, the delayed second video signal and the delayed second audio signal, wherein the first audio signal and the second audio signal provide undelayed real-time verbal communication between the first location and the second location.

8. A signal transmitting-receiving system as set forth in claim 7, wherein the first video signal is a digital video signal and the compression processing and the extension processing of the first video signal is performed according to the MPEG-2 format of the Motion Picture Experts Group.

9. A signal transmitting-receiving system comprising:

(a) a remote signal transmitter/receiver including:

audio processing means for compression processing a remote audio signal with substantially no delay time to produce a subaudio signal;

video processing means for compression processing a remote video signal with a first delay time due to compression processing;

first delaying means for delaying the remote audio signal by the first delay time to be coincident with the remote video signal in position on a time axis to thereby produce a main audio signal;

first signal transmitting means for multiplexing and transmitting the compression processed remote video signal, the main audio signal, and the subaudio signal;

first signal receiving means for receiving at least audio signals; and (b) a studio transmitter/receiver including:

second signal receiving means for receiving the multiplexed remote video signal, the main audio signal and the subaudio signal;

decoding means for separating and decoding the received multiplexed remote video signal, the main audio signal and the subaudio signal, the decoding means introducing a second delay time to the decoded remote video signal and the decoded main audio signal but substantially no delay time to the decoded subaudio signal;

second signal transmitting means for transmitting a studio audio signal to the first signal receiving means;

second delay means for delaying the studio audio signal and a studio video signal by a time equal to a total delay time obtained by adding the first delay time and the second delay time; and synthesis means for synthesizing the decoded remote video signal, the decoded main audio signal and the delayed studio video signal and the delayed third audio signal output from the second delay means to produce a composite signal of the remote video signal, the main audio signal, the studio video signal, and the studio audio signal with substantially no relative time delay between them, wherein the subaudio signal and the main audio signal provide undelayed real-time verbal communication between a location of the remote signal transmitter/receiver and a location of the studio transmitter/receiver.

10. A signal transmitting-receiving system as set forth in claim 9, wherein the remote audio signal and the studio audio signal are voice signals of persons at a remote location and a studio location, respectively.

11. A signal transmitting-receiving system as set forth in claim 9, wherein the first signal transmitting means transmits the multiplexed signal in the format of system data, first AUX data, second AUX data, an area for data including data of a title and comments, an area for a video signal, an area for the main audio signal, an area for the subaudio signal, and an area for a Read-Solomon code.

12. A signal transmitting-receiving system comprising:

(a) a remote signal transmitter/receiver including:

first signal transmitting means for transmitting a remote video signal and a remote audio signal; and first signal receiving means for receiving at least an audio signal;

(b) a studio transmitter/receiver including:

second signal receiving means for receiving the remote video signal and the remote audio signal from the first signal transmitting means;

second signal transmitting means for transmitting a studio audio signal to the first signal receiving means;

delay means for delaying the studio audio signal, a studio video signal, and the received remote audio signal by a time equal to a total delay time obtained by adding a first delay time caused by compression processing with respect to the remote video signal in the first signal transmitting means and a second delay time caused by extension processing with respect to the remote video signal in the second signal receiving means; and synthesis means for synthesizing together the remote audio signal, the studio video signal and the studio audio signal from the first delay means with the remote video signal from the second signal receiving means to produce a composite audio and video signal which, when reproduced to a viewer, has no apparent relative time displacement between the composited audio signals and video signals, wherein the remote audio signal and the studio audio signal provide undelayed real-time verbal communication between a location of the remote signal transmitter/receiver and a location of the studio transmitter/receiver.

13. A signal transmitting-receiving system as set forth in claim 12, wherein the remote audio signal and the studio audio signal are voice signals of persons at a remote location and a studio location, respectively.

* * * * *